US012183127B2

(12) United States Patent
Yagasaki

(10) Patent No.: US 12,183,127 B2
(45) Date of Patent: Dec. 31, 2024

(54) TIRE SLIP STATE DETERMINATION METHOD

(71) Applicant: HONDA MOTOR CO., LTD., Tokyo (JP)

(72) Inventor: Toru Yagasaki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 226 days.

(21) Appl. No.: 18/153,261

(22) Filed: Jan. 11, 2023

(65) Prior Publication Data

US 2023/0222851 A1 Jul. 13, 2023

(30) Foreign Application Priority Data

Jan. 13, 2022 (JP) .............................. JP2022-003977

(51) Int. Cl.
*G07C 5/02* (2006.01)
*B60W 30/18* (2012.01)
*B60W 40/10* (2012.01)

(52) U.S. Cl.
CPC ......... *G07C 5/02* (2013.01); *B60W 30/18172* (2013.01); *B60W 40/10* (2013.01)

(58) Field of Classification Search
CPC .... G07C 5/02; B60W 30/18172; B60W 40/10
See application file for complete search history.

(56) References Cited

U.S. PATENT DOCUMENTS

| 5,944,082 A * | 8/1999 | Thompson ............... B60C 11/03 |
| | | 152/209.8 |
| 10,988,142 B1* | 4/2021 | Mehrotra ............ B60W 40/068 |
| 2005/0161295 A1* | 7/2005 | Nilsson ............... B60T 8/17636 |
| | | 188/158 |

(Continued)

FOREIGN PATENT DOCUMENTS

| JP | 2010179767 A | 8/2010 |
| JP | 2018155696 A | 10/2018 |

(Continued)

OTHER PUBLICATIONS

Notice of Reasons for Refusal for Japanese Patent Application No. 2022-003977 dated Jul. 11, 2023; 6 pp.

*Primary Examiner* — Seth A Silverman
(74) *Attorney, Agent, or Firm* — Armstrong Teasdale LLP

(57) ABSTRACT

A tire slip state determination method includes: detecting rotation fluctuations of a power transmission member and a wheel body of a wheel; determining, based on an amplitude ratio of a rotation fluctuation amplitude of the wheel body to a rotation fluctuation amplitude of the power transmission member and a phase delay of the rotation fluctuation of the wheel body relative to the rotation fluctuation of the power transmission member, whether a vibration mode of the wheel body and the tire is an elastic slip mode or a sliding slip mode; and determining that the tire is in the sliding slip state when the vibration mode is the sliding slip mode. The amplitude ratio and the phase delay are calculated by using, as a tire driving radius, an effective rolling radius in a region (Continued)

in which a relationship between a dynamic load radius and the effective rolling radius is linear.

5 Claims, 26 Drawing Sheets

(56) References Cited

U.S. PATENT DOCUMENTS

| | | | |
|---|---|---|---|
| 2009/0149298 A1* | 6/2009 | Otanez | G01M 13/022 |
| | | | 701/55 |
| 2015/0231932 A1* | 8/2015 | Singh | B60C 11/246 |
| | | | 701/34.4 |
| 2019/0113440 A1 | 4/2019 | Koike | |
| 2019/0219399 A1 | 7/2019 | Noguchi et al. | |

FOREIGN PATENT DOCUMENTS

| | | |
|---|---|---|
| JP | 2019031112 A | 2/2019 |
| JP | 2019074414 A | 5/2019 |
| JP | 2020066361 A | 4/2020 |
| WO | 2018047254 A1 | 3/2018 |

* cited by examiner

TIRE SLIP STATE DETERMINATION METHOD

TECHNICAL FIELD

The present invention relates to a tire slip state determination method.

BACKGROUND ART

When the tire is gripping, a drive shaft torsional vibration is generated and when the tire slips, the tire slip causes the torsion of the drive shaft to be released and the drive shaft torsional vibration disappears. JP2019-31112A discloses a travel control method which detects a rotation fluctuation of a differential device and a rotation fluctuation of a wheel body connected to the drive shaft via the differential device, sets a slip identification quantity based on an amplitude ratio and a phase delay of a rotation fluctuation amplitude of the wheel body relative to a rotation fluctuation amplitude of the differential device, and controls the driving force of a tire such that the slip identification quantity does not exceed a slip identification quantity threshold value which corresponds to an elastic slip limit of the tire for the road surface.

In JP2019-31112A, a dynamic radius of the tire is used to calculate the amplitude ratio and the phase delay of the rotation fluctuation amplitude of the wheel body relative to the rotation fluctuation amplitude of the differential device. The dynamic radius of the tire is considered a dynamic load radius that represents the distance between the ground contact surface and the wheel axle when a load is applied to the tire. The dynamic load radius is likely to be influenced by the vertical load and the tire air pressure. Therefore, the friction torque generated at the ground contact surface, the viscous resistive force between the tire and the ground contact surface, and the tire stiffness that are calculated based on the dynamic radius of the tire tend to fluctuate due to influence of the vertical load and the tire air pressure.

SUMMARY OF THE INVENTION

In view of the foregoing background, a primary object of the present invention is to provide a tire slip state determination method which is less influenced by the vertical load and the tire air pressure.

To achieve the above object, one aspect of the present invention provides a tire slip state determination method for determining a slip state of a tire of a wheel relative to a road surface, wherein the wheel is connected to a drive source via a power transmission member, the method comprising: detecting a rotation fluctuation of the power transmission member and a rotation fluctuation of a wheel body of the wheel; determining, based on an amplitude ratio of a rotation fluctuation amplitude of the wheel body to a rotation fluctuation amplitude of the power transmission member and a phase delay of the rotation fluctuation of the wheel body relative to the rotation fluctuation of the power transmission member, whether a vibration mode of the wheel body and the tire is an elastic slip mode in which the vibration mode of the wheel body and the tire represents a frequency response in an elastic slip state or a sliding slip mode in which the vibration mode of the wheel body and the tire represents a frequency response in a sliding slip state; and determining that the tire is in the sliding slip state when the vibration mode of the wheel body and the tire is the sliding slip mode, wherein the amplitude ratio and the phase delay are calculated by using, as a tire driving radius, an effective rolling radius in a region in which a relationship between a dynamic load radius and the effective rolling radius is linear, the dynamic load radius is a distance between a central axis of the wheel and the road surface, and the effective rolling radius is a value obtained by dividing a distance traveled by the tire in one rotation by $2\pi$.

According to this aspect, a tire slip state determination method which is less influenced by the vertical load and the tire air pressure is provided. The effective rolling radius is less influenced by the vertical load and the tire air pressure than the dynamic load radius is.

Preferably, in the region in which the relationship between the dynamic load radius and the effective rolling radius is linear, a correlation coefficient between the dynamic load radius and the effective rolling radius is 0.99 or higher.

Preferably, the tire driving radius is the effective rolling radius in a 1G state.

Preferably, the tire driving radius is the effective rolling radius when a vertical load applied to the wheel is in a range from 2000 N to 6500 N.

Preferably, the effective rolling radius is calculated by dividing a travel distance of a vehicle in a predetermined period detected based on a GNSS signal by a number of rotations of the tire in the predetermined period.

According to the foregoing configuration, it is possible to provide a tire slip state determination method which is less influenced by the vertical load and the tire air pressure.

DETAILED DESCRIPTION OF THE INVENTION

Figure 1:
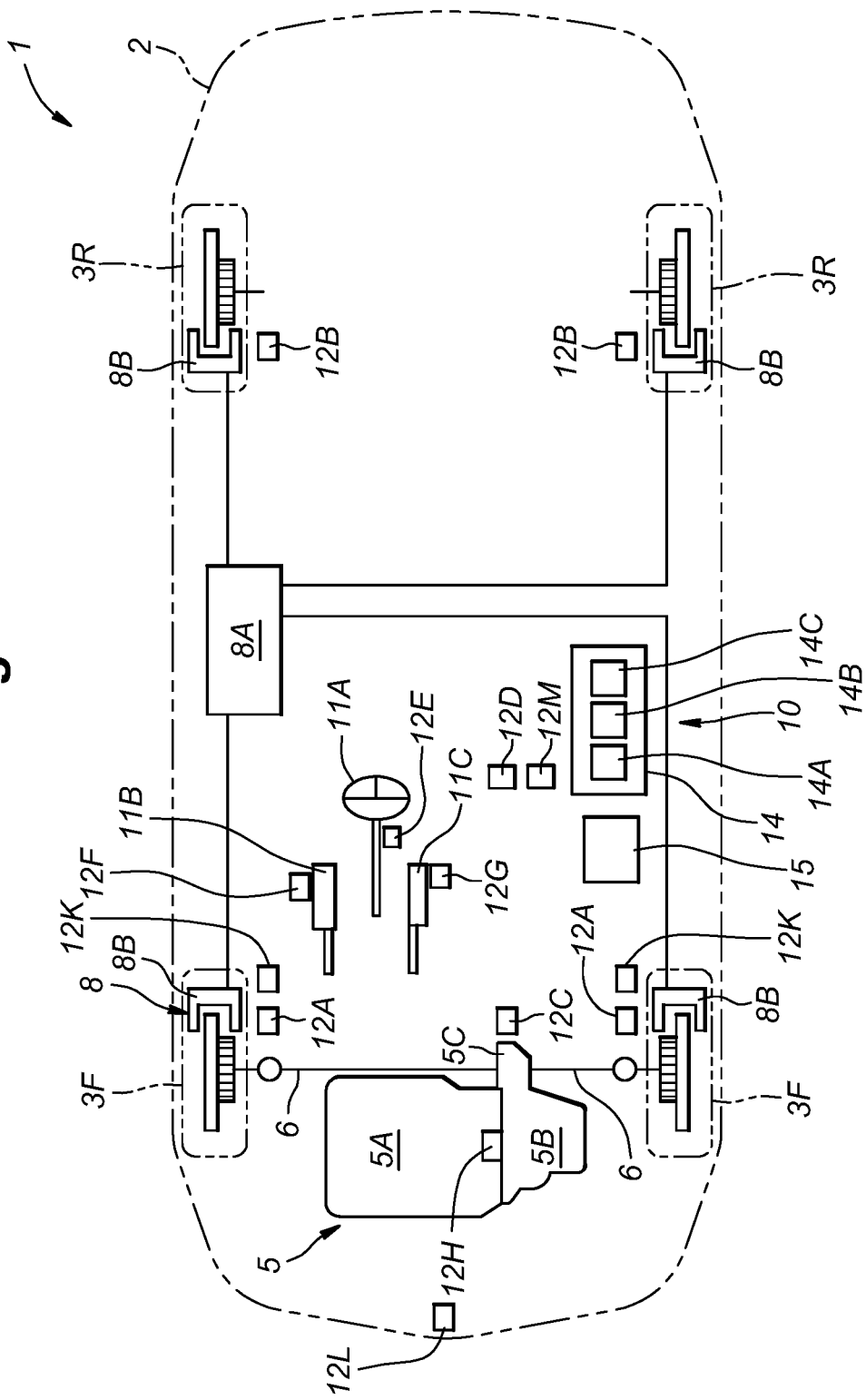
FIG. 1 is a configuration diagram of a vehicle in which a vehicle control system is installed.

In the following, a tire slip state determination method according to an embodiment of the present invention and a travel control system that executes the tire slip state determination method will be described with reference to the drawings. As shown in FIG. 1, a vehicle 1 is a four-wheeled automobile and has a vehicle body 2 and four wheels 3 provided on the vehicle body 2. The wheels 3 include two front wheels 3F which are driving wheels and two rear wheels 3R which are non-driving wheels. Each wheel 3 has a wheel body W and a tire T mounted on the wheel body W.

The vehicle 1 has a drive source 5 for driving the front wheels 3F. The drive source 5 may be an internal combustion engine or an electric motor. The drive source 5 may include a reducer and a differential device. In the present embodiment, the drive source 5 is configured by an internal combustion engine 5A, a reducer 5B, and a differential device 5C (DN). The differential device 5C of the drive source 5 is connected to each front wheel 3F via a power transmission member 6. The power transmission member 6 may be a drive shaft.

The vehicle 1 has braking devices 8 for braking the respective wheels 3. Each braking device 8 includes a hydraulic pressure supply device 8A and a disc brake 8B provided in the wheel body W of each wheel 3 to be actuated by the hydraulic pressure from the hydraulic pressure supply device 8A.

The vehicle 1 has a travel control system 10 that controls the drive source 5 and the braking device 8. The travel control system 10 includes a control device 14 that controls the drive source 5 and the braking device 8 based on the signals from a driving operation element 11 and a vehicle sensor 12. The driving operation element 11 includes a steering wheel 11A for receiving a steering operation of the driver, an accelerator pedal 11B for receiving an acceleration operation of the driver, and a brake pedal 11C for receiving a deceleration operation of the driver.

The vehicle sensor 12 includes left and right front wheel speed sensors 12A that detect the rotation speeds of the left and right front wheel, respectively, left and right rear wheel speed sensors 12B that detect the rotation speeds of the left and right rear wheel, respectively, a drive source rotation speed sensor 12C that detects the rotation speed of an output end of the drive source 5, and an acceleration sensor 12D that detects the forward-backward acceleration and the lateral acceleration of the vehicle body 2. The front wheel speed sensors 12A and the rear wheel speed sensors 12B each detect the rotation speed of the corresponding wheel body W. The left and right rear wheel speed sensors 12B and the acceleration sensor 12D function as a vehicle body speed acquisition unit that acquires information related to the vehicle body speed.

The drive source rotation speed sensor 12C detects the rotation speed of the final gear of the differential device of the drive source 5. The vehicle sensor 12 further includes a steering angle sensor 12E that detects the steering angle of the steering wheel 11A, an accelerator pedal sensor 12F that detects the operation amount of the accelerator pedal 11B, a brake pedal sensor 12G that detects the operation amount of the brake pedal 11C, and an engine rotation speed sensor 12H that detects the rotation speed of the internal combustion engine 5A. Also, the vehicle sensor 12 includes a vertical acceleration sensor 12K that detects the vertical acceleration of the vehicle body 2. The vertical acceleration sensor 12K is preferably provided for each wheel 3. The vertical acceleration sensor 12K may be provided on a suspension arm (not shown in the drawings) supporting each wheel 3. The acceleration sensor 12D and the vertical acceleration sensor 12K may be configured as a common 3-axis or 6-axis acceleration sensor. The output torque of the internal combustion engine 5A is estimated by the control device 14, as described later.

The vehicle sensor 12 further includes a distance sensor 12L that measures the distance from the vehicle to an object around the vehicle and an inclination angle sensor 12M that measures the inclination angle of the vehicle. The distance sensor 12L preferably is a millimeter wave radar, an ultrasonic sensor, a lidar, or the like. The inclination angle sensor 12M preferably is a Micro Electro Mechanical System (MEMS) inertial sensor or the like.

The control device 14 is an electronic control unit (ECU) constituted of a CPU, a ROM, a RAM, and the like. The control device 14 performs various vehicle controls by executing computational processing according to a program with the CPU. The control device 14 includes an estimation unit 14A, a control unit 14B, and a torque acquisition unit 14C (torque acquisition means). The estimation unit 14A determines the slip state of the tire based on at least the rotation speed of the drive source 5, the rotation speed of the wheel body W, the vehicle body speed, and the torque applied to the wheel body W. The control unit 14B controls at least one of the drive source 5 and the braking device 8 based on the slip state of the tire.

The torque acquisition unit 14C acquires the output torque of the internal combustion engine 5A. The torque acquisition unit 14C preferably estimates the output torque of the internal combustion engine 5A based on an intake air volume and a negative pressure in the intake manifold, for example. Also, when the drive source 5 is an electric motor, the output torque of the electric motor is preferably estimated based on the phase current supplied to the electric motor. Note that in another embodiment, a torque sensor for detecting the output torque may be provided on the internal combustion engine 5A or the electric motor. Also, the torque acquisition unit 14C estimates the braking torque applied to the wheel body W based on the amount of control of the braking device 8 by the control unit 14B.

The control device 14 is connected to a navigation device 15. The navigation device 15 determines the position of the vehicle 1 based on the GNSS (Global Navigation Satellite System) signal. The navigation device 15 has map information. The map information preferably includes information related to the characteristics of the road surfaces such as the shape, inclination angle (bank angle), and curvature of each road.

In the following, a tire slip state determination method performed by the estimation unit 14A will be described. The estimation unit 14A determines the slip state of the tire by executing a program constructed based on the theory shown below.

Since the wheel body W is made of metal such as aluminum or steel, the stiffness of the wheel body W is sufficiently high compared to the tire T which is made of rubber. When a driving torque is applied to the wheel body W, elastic deformation occurs in a side wall portion and a tread portion of the tire T. Therefore, it is assumed here that the wheel body W and the tread surface of the tire T are represented by rigid body masses with a spring force acting in a direction to suppress the torsion between the wheel body W and the tread surface of the tire T. At the contact part between the tire T and the road surface, the tire T deforms due to the mass of the vehicle 1 so that the tire T makes contact (ground contact surface) with the road surface with a certain constant width (ground contact width). A friction force F acts between the tire and the road surface at the ground contact surface, and this friction force F is expressed by the following formula.

$$F = \mu N \tag{1}$$

Here, $\mu$ is a road surface friction coefficient, which is a friction coefficient between the tire T and the road surface, and N is a wheel load, which is a ground contact load of the tire T. The road surface friction coefficient $\mu$ changes depending on the air pressure and aging of the tire T, the road surface, the weather, the climate, and so on. The magnitude of the friction force F needs to match the magnitude of the driving force, which is a force for making the vehicle 1 travel (acceleration, deceleration, or constant speed travel) against the travel resistance.

At the moment when the driving torque is applied to the wheel body W, torque is not yet transmitted to the tire T and the tire T does not roll yet. At this time, the tire T deforms elastically and a torsion angle is generated between the wheel body W and the tire T. In this state, the tire T is in a stationary torsion state in which the torsion angle is generated in proportion to the driving torque of the wheel body W. Upon generation of the torsion angle, torque is transmitted to the tire T as a reaction force thereof, and the tire T starts rolling. As the tire T rolls, one element of the tire T that was generating the elastic deformation leaves from the ground contact surface and the elastic strain is released. At this time, the reaction force for transmitting the driving torque of the wheel body W becomes insufficient by the magnitude corresponding to the released elastic strain, and thus, the rolling of the tire T is going to stop temporarily. However, in place of the one element of the tire T that has left the ground contact surface, a new element of the tire T comes into contact with the road surface and produces an elastic strain so that the lost reaction force is recovered and the tire T rolls again. A case like this where the boundary condition regarding the individual elements is not unique to each element and moves along the motion of the element is particularly called a moving boundary. When the actual tire T rolls continuously, the above phenomenon occurs in succession, and therefore, the rolling angle of the tire T decreases at a constant rate relative to the rotation angle of the wheel body W. Since the rotation angle of the wheel body W per unit time is proportional to the rotation speed (rotation angular speed), the rolling angle of the tire T per unit time also relatively decreases in proportion to the rotation speed of the wheel body W, and a constant rotation transmission loss occurs. This phenomenon is called elastic slip because an apparent slip is generated between the wheel body W and the road surface due to elastic deformation. Since an amount of elastic slip is created at a constant rate relative to the rotation speed of the wheel body W, a ratio $S_r$ between the rotation speed loss $\Delta\omega$ due to the slip and the rotation speed $\omega_{wheel}$ of the wheel body W is regarded as a slip speed ratio.

$$S_r = \Delta\omega/\omega_{wheel} \tag{2}$$

Figure 2:
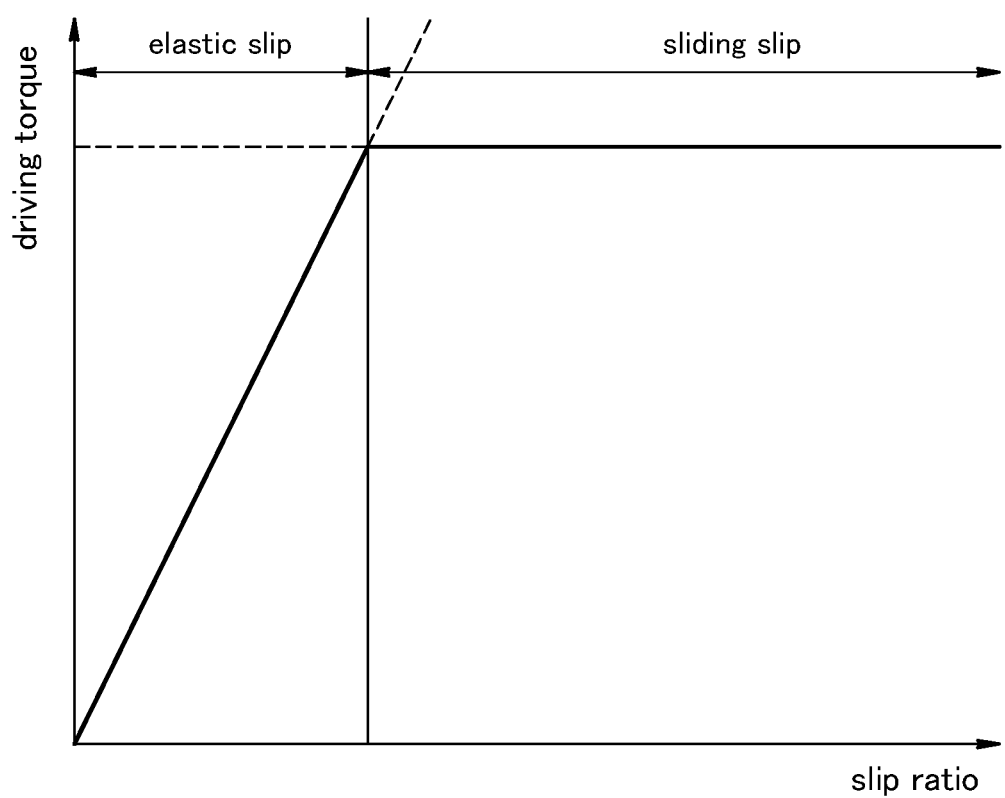
FIG. 2 is a graph showing a relationship between a slip ratio and a driving torque.

The characteristics of the elastic slip of the tire T are illustrated in FIG. 2. Because there is a limit to the friction force between the tire T and the road surface, as the driving torque of the wheel body W increases, the ground contact surface of the tire T and the road surface start slipping. This is called sliding slip to distinguish from the elastic slip. Thus, as the driving torque of the wheel body W increases, the elastic slip state shifts to the sliding slip state. The boundary between the elastic slip state and the sliding slip state is called an elastic slip limit or an adhesion limit, and the driving force (torque) corresponding to the adhesion limit is called an adhesion limit driving force (torque).

In the elastic slip state, when a torsion angle ($\varphi_E$) has occurred between the wheel body W and the tire T due to elastic deformation and the ground contact surface has moved by the ground contact surface length, a strain energy ($k_T \times \varphi_E^2/2$) due to the elastic deformation is stored in the ground contact surface before rolling, and the strain energy is released by the rolling. This strain energy does no work in relation to the travel of the vehicle 1, and therefore, it can be considered that in this state, the driving energy from the wheel body W is dissipated by the cycle of buildup and release of strain. With the understanding that such energy dissipation occurs due to the apparent slip (elastic slip), the following formula can be obtained using the friction force F acting on the ground contact surface.

$$k_T \varphi_E^2/2 = FR\varphi_E = T_f \varphi_E \tag{3}$$

Namely, the energy dissipation can be substituted by the virtual work calculated from the friction force and the apparent slip as shown in the formula 3, where $k_T$ is a torsional stiffness [Nm/rad] of the tire T, R is a driving radius [m] of the tire T, and $T_f$ is a friction torque [Nm] produced at the ground contact surface. Provided that when the tire T rolls in accordance with the torsion angle $\varphi_E$, the rotation angle of the wheel body W including the torsion angle $\varphi_E$ is $\varphi_{wheel}$, the slip speed ratio $S_r$ is represented by the following formula 4 based on the geometric relationship.

$$S_r = \varphi_E/\varphi_{wheel} \tag{4}$$

From the formula 2 and the formula 4, $\varphi_E$ is represented by the following formula 5.

$$\varphi_E = (\varphi_{wheel}/\omega_{wheel})\Delta\omega \quad (5)$$

By putting this into the formula 3, the following formula 6 is derived.

$$T_f = (k_T \varphi_{wheel}/2\, \omega_{wheel})\Delta\omega = c_T \Delta\omega \quad (6)$$

As expressed in the formula 6, the friction torque $T_f$ is represented by a viscous resistance force that is proportional to the slip (rotation speed loss) $\Delta\omega$ occurring between the wheel body W and the road surface. Here, $c_T$ is a friction damping coefficient [Nm/(rad/s)] between the tire and the road surface, corresponds to a viscosity coefficient, and is proportional to the tire torsional stiffness $k_T$.

Here, as the driving radius R of the tire T used in the formula 3, an effective rolling radius ERR in the region in which the relationship between the dynamic load radius DLR and the effective rolling radius ERR is linear is used. In the region in which the relationship between the dynamic load radius DLR and the effective rolling radius ERR is linear, the correlation coefficient between the dynamic load radius DLR and the effective rolling radius ERR is 0.99 or higher. Alternatively, as the driving radius R of the tire T used in the formula 3, the effective rolling radius ERR when the vertical load applied to the tire T is 1G may be used.

Figure 3:
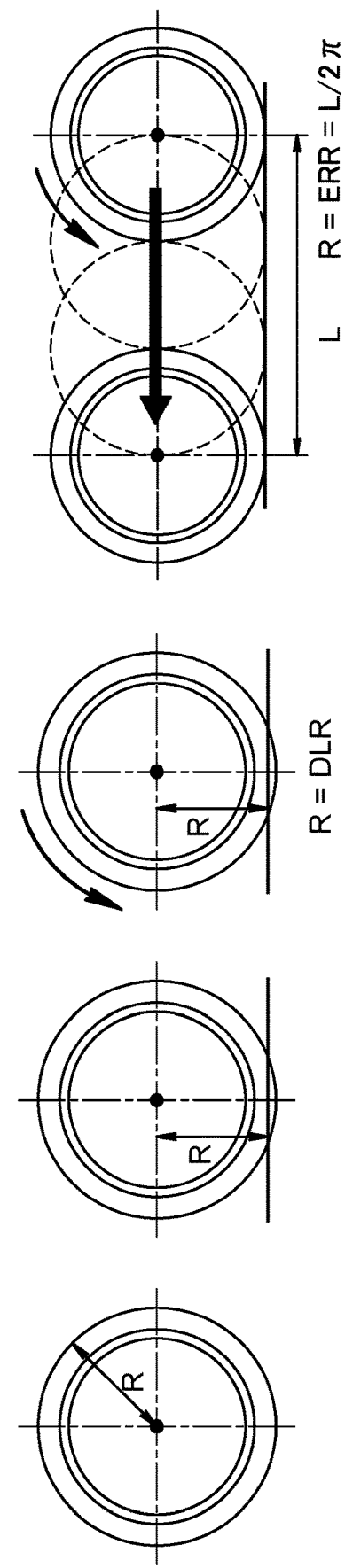
FIGS. 3A-3D are explanatory diagrams for showing a tire driving radius.

As shown in FIGS. 3A to 3D, the radius of the tire T generally includes a no-load radius OD, a static load radius SLR, the dynamic load radius DLR, and the effective rolling radius ERR. As shown in FIG. 3A, the no-load radius OD is a distance from the central axis of the wheel to the outer circumferential surface of the tire in a state in which the wheel is not in contact with the road surface, the wheel is not rotating, and no load is applied to the central axis of the wheel. As shown in FIG. 3B, the static load radius SLR is a distance from the central axis of the wheel to the road in a state in which surface the wheel is in contact with the road surface, the wheel is not rotating, and a load is applied to the central axis of the wheel. As shown in FIG. 3C, the dynamic load radius DLR is a distance from the central axis of the wheel to the road surface in which the wheel is in contact with the road surface, the wheel is rotating, and a load is applied to the central axis of the wheel. As shown in FIG. 3D, the effective rolling radius ERR is a value obtained by dividing the distance traveled by the tire in one rotation by $2\pi$ in a state in which the wheel is in contact with the road surface, the wheel is rotating, and a load is applied to the central axis of the wheel.

Figure 4:
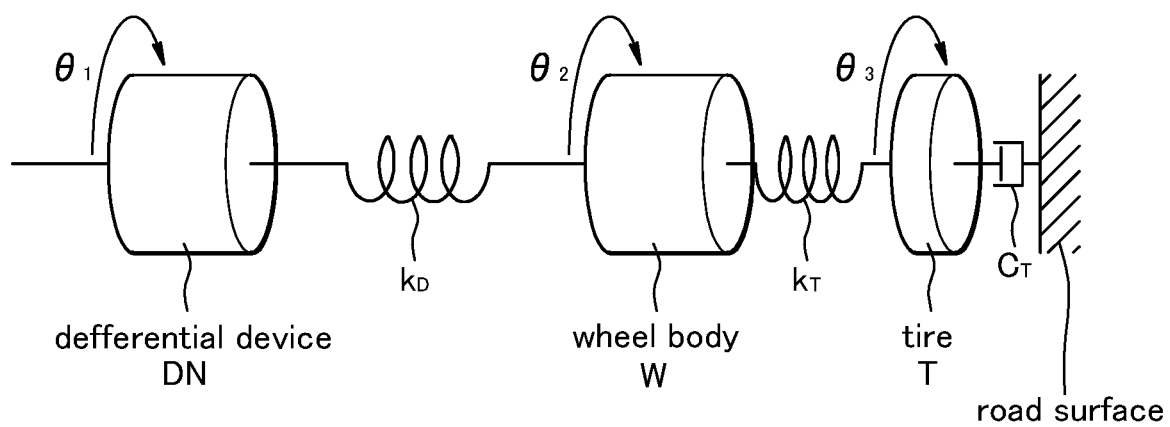
FIG. 4 is an explanatory diagram showing a dynamic model of a driving wheel.

A dynamic model from the drive source 5 to the contact surface can be represented as illustrated in FIG. 4. Based on this model, the state equation is represented by the formula 7 below. The formula 7 is derived for one of the left and right front wheels of the vehicle 1 constituted as an FF vehicle which has the internal combustion engine installed in the front portion thereof to drive the front wheels via the transmission.

$$\left.\begin{array}{l} I_W \ddot{\theta}_W = k_D(\theta_{DN} - \theta_W) - k_T(\theta_W - \theta_T) \\ I_T \ddot{\theta}_T = k_T(\theta_W - \theta_T) - c_T \dot{\theta}_T \end{array}\right\} \quad (7)$$

Here, $\theta_{DN}$ is a rotation angle perturbation [rad] of the final gear of the differential device DN (the output shaft of the drive source 5), $\theta_W$ is a rotation angle perturbation [rad] of the wheel body, $\theta_T$ is a rotation angle perturbation [rad] of the tire, $I_W$ is a moment of inertia [kgm²] of the wheel body, $I_T$ is a moment of inertia [kgm²] of the tire, and $k_D$ is a torsional stiffness [Nm/rad] of the power transmission member 6 (drive shaft).

By making the formula 7 dimensionless using the following formula 8, the state variable (vector quantity) represented by the formula 9 can be represented by the formula 10.

$$x_1 = \theta_{DN},\; x_2 = \theta_W,\; x_3 = \theta_T \quad (8)$$

$$\omega_1 = \sqrt{\frac{k_D}{I_W}},\; \omega_2 = \sqrt{\frac{k_T}{I_W}} \quad$$

$$\rho = \sqrt{\frac{I_W}{I_T}},\; \zeta_2 = \frac{c_T}{\sqrt{I_W k_T}} \quad (9)$$

$$x = {}^t(x_2\; \dot{x}_2\; x_3\; \dot{x}_3)$$

$$\left.\begin{array}{l} \dot{x} = Ax \\ A = \begin{pmatrix} 0 & 1 & 0 & 0 \\ -\omega_1^2 - \omega_2^2 & 0 & \omega_2^2 & 0 \\ 0 & 0 & 0 & 1 \\ \rho^2 \omega_2^2 & 0 & -\rho^2 \omega_2^2 & -\rho^2 \omega_2 \zeta_2 \end{pmatrix} \end{array}\right\} \quad (10)$$

Figure 5A:
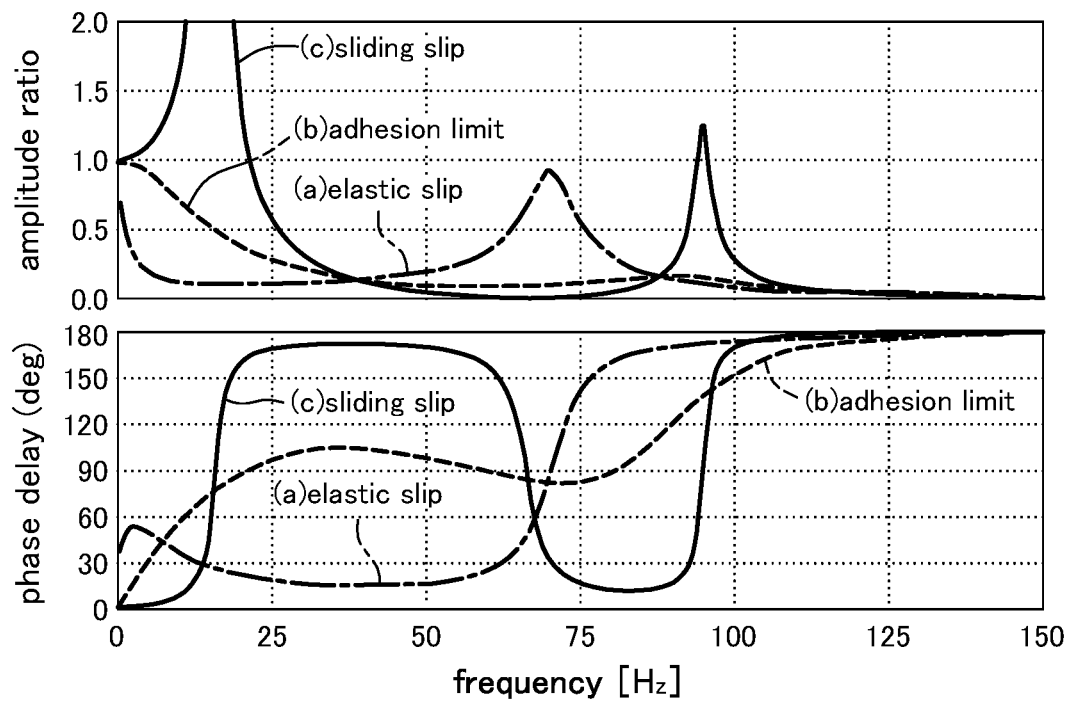
FIG. 5A is a graph showing the characteristics of the rotation fluctuation transmission between a differential device and the driving wheel.

The frequency response of the rotation fluctuation of the wheel body W to the rotation fluctuation of the differential device DN obtained from the formula 10 can be illustrated as in FIG. 5A. FIG. 5A shows, with respect to the frequency, an amplification ratio (amplitude ratio m) of the rotation fluctuation amplitude of the wheel body W to the rotation fluctuation amplitude of the differential device DN and a phase delay (phase delay Ψ1) of the rotation fluctuation of the wheel body W relative to the rotation fluctuation of the differential device DN.

From the formula 6, the slip state approaches the sliding slip state as the value of the friction damping coefficient $c_T$ decreases. In FIG. 5A, (a) represents the response in the elastic slip state, and (c) represents the response in the sliding slip state. Also, (b) indicates the boundary (adhesion limit) between the two slip states. When the graphs (a) and (c) indicating the amplitude ratios in FIG. 5A are compared with each other, it can be seen that when the sliding slip state is entered, a new peak appears on the low frequency side and the peak on the high frequency side moves toward a higher frequency side. The vibration mode corresponding to the peak on the high frequency side will be referred to as an elastic slip mode, and the vibration mode corresponding to the peak on the low frequency side will be referred to as a sliding slip mode.

Figure 5B:
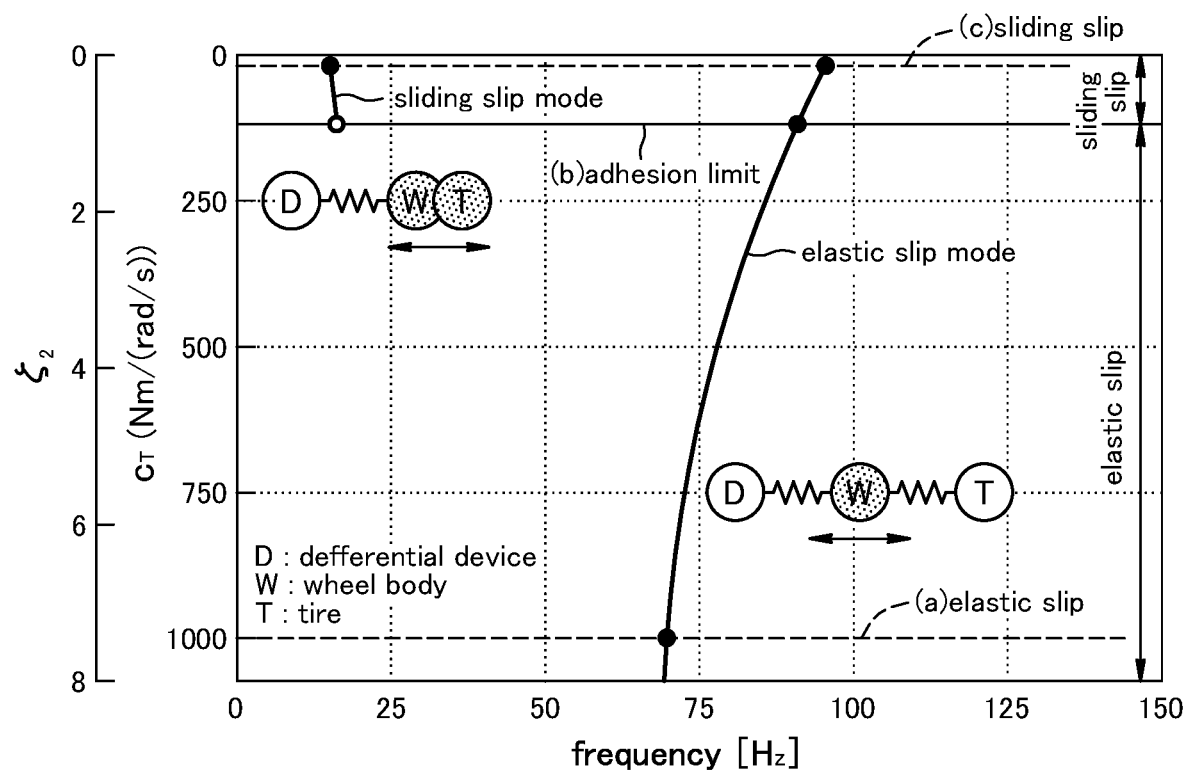
FIG. 5B is an explanatory diagram showing a relationship between the frequency and vibration modes.

Existence ranges of the elastic slip mode and the sliding slip mode with respect to the frequency and the friction damping coefficient $c_T$ are illustrated in FIG. 5B. In FIG. 5B, the existence ranges of the elastic slip mode and the sliding slip mode are shown by solid lines.

In the elastic slip mode, since the driving force is transmitted to the road surface due to the elastic deformation of the tire T, the elastic force produced by the tire torsional stiffness $k_T$ acts on the wheel body W as a reaction force. Therefore, the wheel body W receives a combination of the elastic forces produced by the drive shaft stiffness $k_D$ and the tire torsional stiffness $k_T$ so that the wheel body W vibrates. The elastic slip mode is seen on the high frequency side in FIGS. 5A and 5B. As shown in FIG. 5B, the elastic slip mode shifts toward a higher frequency side as the friction damping coefficient $c_T$ decreases, namely, as the slip state approaches the sliding slip state from the elastic slip state. This corresponds to the phenomenon that in the graph showing the amplitude ratios in FIG. 5A, the peak on the high frequency side is moved toward a higher frequency side when the state has transitioned to the sliding slip state.

In the sliding slip mode, since the tire T and the road surface dynamically slip, the elastic force produced due to the tire torsional stiffness $k_T$ is released by the slip and the reaction force acting on the wheel body W also disappears. Therefore, the wheel body W and the tire T become unitary and receive only the elastic force produced due to the drive shaft stiffness $k_D$ so that they vibrate in the same phase. The sliding slip mode is seen on the low frequency side in FIGS. 5A and 5B. As shown in FIG. 5B, the sliding slip mode appears when the friction damping coefficient $c_T$ becomes less than the constant value, namely, namely when the slip state becomes the sliding slip state, and does not appear in the elastic slip state. This corresponds to the phenomenon that in the graph showing the amplitude ratio in FIG. 5A, a new peak appears on the low frequency side when the slip state becomes the sliding slip state.

As described above, as the slip state transitions from the elastic slip state to the sliding slip state, the sliding slip mode emerges. Therefore, it appears to be possible to determination the adhesion limit by monitoring the emergence of the sliding slip mode. However, as seen by the amplitude ratio in FIG. 5A, a peak on the low frequency side cannot be confirmed yet at the adhesion limit. Namely, only by simply observing the vibration waveform, it is not possible to strictly determine the emergence of the sliding slip mode. Therefore, an attention is focused on a dimensionless quantity $\zeta_2$ representing the damping state of the system. As shown in the formula 8, the dimensionless $\zeta_2$ quantity is a quantity made dimensionless by the friction damping coefficient $c_T$ and the tire torsional stiffness $k_T$ and uniquely representing the damping state of the system regardless of changes of various factors. If the current dimensionless quantity can be estimated, by comparing it with a threshold value corresponding to the adhesion limit, occurrence of the sliding slip can be strictly determined. Also, since the deviation between the dimensionless quantity $\zeta_2$ and the aforementioned threshold value can be used as a basis for determining the margin till the sliding slip occurs, it is useful to know the dimensionless quantity $\zeta_2$. In the following, first, an acquisition method of the dimensionless quantity $\zeta_2$ will be described.

A torque fluctuation generally occurs in the internal combustion engine serving as the drive source 5 of the vehicle 1, and this torque fluctuation is also transmitted to the tire from the differential device DN. As a cause of the torque fluctuation, there is a fluctuation of the cylinder internal pressure in the case of the internal combustion engine, and a cogging torque attributed to the number of poles in the case of the electric motor. In the differential device DN, a rotation fluctuation attributed to the input torque fluctuation occurs simultaneously. Here, the rotation fluctuation of the differential device DN is expressed by the following formula 11.

$$\dot{x}_1 = A_1 \sin \Omega t \qquad (11)$$

The formula 11 can be considered a forced excitation under the boundary condition. $A_1$ is a rotation fluctuation amplitude [m] of the differential device DN, $\Omega$ is an angular frequency [rad/s] of the excitation force (torque fluctuation of the internal combustion engine E), and t is time [s]. In such a forced excitation state, the state equation indicated by the formula 10 becomes as follows.

$$\dot{x} = Ax + b \qquad (12)$$
$$A = \begin{pmatrix} 0 & 1 & 0 & 0 \\ -\omega_1^2 - \omega_2^2 & 0 & \omega_2^2 & 0 \\ 0 & 0 & 0 & 1 \\ \rho^2 \omega_2^2 & 0 & -\rho^2 \omega_2^2 & -\rho^2 \omega_2 \zeta_2 \end{pmatrix}, b = \begin{pmatrix} 0 \\ -\frac{\omega_1^2}{\Omega} A_1 \cos \Omega t \\ 0 \\ 0 \end{pmatrix}$$

In the formula 12, B represents an external force (excitation input), and the natural vibration mode (hereinafter referred to as a natural mode) that the original system has is determined by a Jacobian matrix A. The parameters deciding the Jacobian matrix A are $\rho$, $\omega_1$, $\omega_2$, and of which $\rho$ and $\omega_1$ are design specifications (known values). Therefore, once the dimensionless quantity $\omega_2$ and the dimensionless quantity $\zeta_2$ corresponding to the slip identification quantity are known, the natural mode can be known. In the formula 7, there are two dominant equations while there are two dimensionless quantities that are unknown (namely, $\omega_2$ and $\zeta_2$), and therefore, $\omega_2$, $\zeta_2$ should be able to be decided uniquely. Note that because the dimensionless quantity $\omega_2$ is obtained from the tire torsional stiffness $k_T$ and the dimensionless quantity $\zeta_2$ is obtained from the friction damping coefficient $c_T$ and the tire torsional stiffness $k_T$, that the dimensionless quantities $\omega_2$, $\zeta_2$ can be decided is equivalent to that the friction damping coefficient $c_T$ and the tire torsional stiffness $k_T$ can be decided.

Assume that the periodic solutions of the formula 12 are represented as follows.

$$\dot{x}_1 = A_1 \sin(\tau + \Psi_1)$$

$$\dot{x}_2 = A_2 \sin \tau$$

$$\dot{x}_3 = A_3 \sin(\tau - \Psi_3)$$

$$\tau = \Omega t \qquad (13)$$

By putting the periodic solutions of the formula 13 into the formula 12 and performing coefficient decision based on the Galerkin method, the following relational expression is obtained.

$$\left.\begin{array}{c}\dfrac{\rho^4 \zeta_2 \left(\dfrac{\omega_2}{\omega_1}\right)^2 \left(\dfrac{\Omega}{\omega_2}\right)}{\left(\dfrac{\Omega}{\omega_2}\right)^4 + \rho^2 (\rho^2 \zeta_2^2 - 2)\left(\dfrac{\Omega}{\omega_2}\right)^2 + \rho^4} = \dfrac{\sin \Psi_1}{m} \\[4pt] 1 + \left(\dfrac{\omega_2}{\omega_1}\right)^2 \left\{1 - \left(\dfrac{\Omega}{\omega_2}\right)^2\right\} + \dfrac{\rho^2 \left(\dfrac{\omega_2}{\omega_1}\right)^2 \left\{\left(\dfrac{\Omega}{\omega_2}\right)^2 - \rho^2\right\}}{\left(\dfrac{\Omega}{\omega_2}\right)^4 + \rho^2 (\rho^2 \zeta_2^2 - 2)\left(\dfrac{\Omega}{\omega_2}\right)^2 + \rho^4} = \dfrac{\cos \Psi_1}{m} \\[4pt] m = \dfrac{A_2}{A_1}\end{array}\right\} \qquad (14)$$

Here, m is an amplification ratio (amplitude ratio) of the rotation fluctuation amplitude of the wheel body to the rotation fluctuation amplitude of the differential device DN, and $\Psi_1$ is a phase delay of the rotation fluctuation of the wheel body relative to the rotation fluctuation of the differential device DN. Thus, by measuring the rotation fluctuation of the differential device DN and the rotation fluctuation of the wheel body, it is possible to obtain the dimensionless quantities $\omega_2$, $\zeta_2$ from the formula 14.

Figure 6:
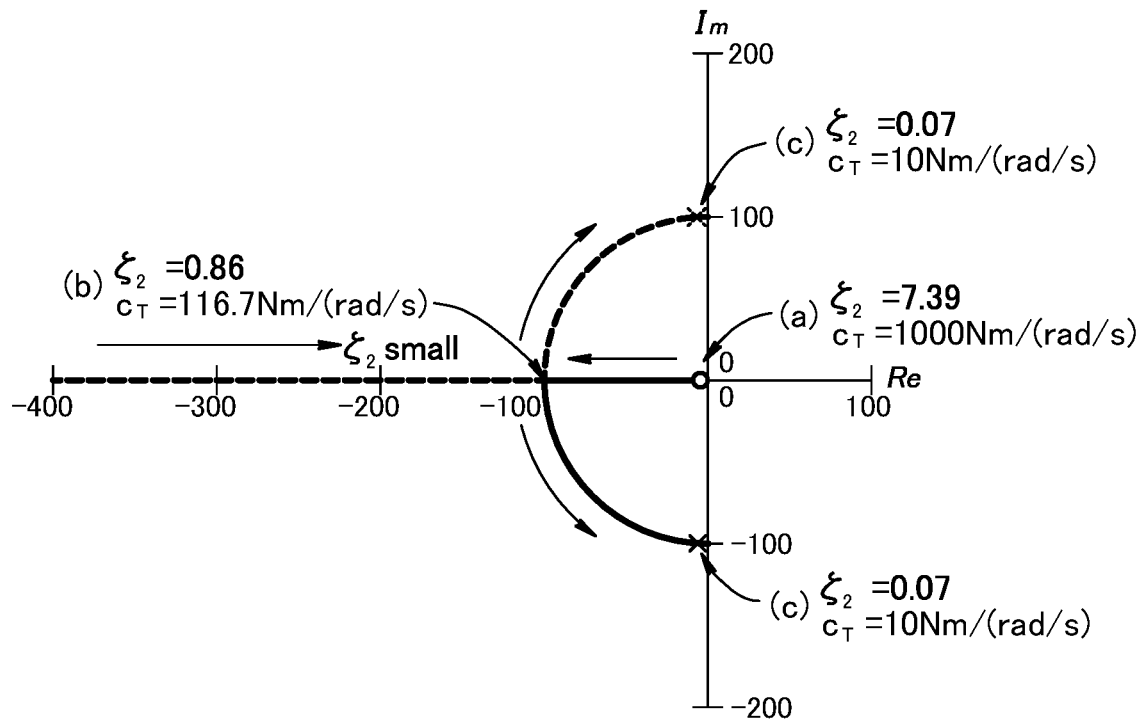
FIG. 6 is a diagram showing a root locus in an elastic slip mode and a sliding slip mode.

Next, provided that the current dimensionless quantities $\omega_2$, $\zeta_2$ have been obtained from the formula 14, a method of acquiring the relationship between the dimensionless quantity $\zeta_2$ and the natural mode will be described. The dimensionless quantity $\omega_2$ reflects the change of the tire torsional stiffness $k_T$ but since there is not a significant change under the same condition, description will be made of the relationship between the dimensionless quantity $\zeta_2$ and the natural mode with an assumption that the tire torsional stiffness $k_T$ is constant. Accordingly, the dimensionless quantity $\zeta_2$ uniquely corresponds to the friction damping coefficient $c_T$. The behavior of the natural mode can be described by obtaining the eigenvalue $\lambda$ of the Jacobian matrix A. FIG. 6 shows the behavior of the eigenvalue $\lambda$ (root locus) corresponding to the above-described sliding slip mode. (a) to (b) of FIG. 6 correspond to (a) to (c) of FIG. 5A. Note that if the tire torsional stiffness $k_T$ changes, the frequency of the vibration mode changes, and accordingly, the scale of the root locus of FIG. 6 changes but there is no change in the main properties described below. Also, in such a case, the dimensionless quantity $\omega_2$ in the current situation, and hence the tire torsional stiffness $k_T$ has been known, and therefore, there is no control problem.

In FIG. 6, the horizontal axis represents a real axis, the vertical axis represents an imaginary axis, and an imaginal part represents a vibration solution. In the elastic slip state (see (a) of FIG. 6), a pair of roots are on the real axis, indicating that there is no vibration solution. Namely, no vibration corresponding to the sliding slip mode is generated. On the other hand, when the slip state becomes the sliding slip state (see (c) of FIG. 6), the root has an imaginal part, indicating that a vibration is produced. Namely, it can be appreciated that when the dimensionless quantity $\zeta_2$ becomes less than $\zeta_C$ (see (c) of FIG. 6), the sliding slip mode emerges. Thus, based on the value of the dimensionless quantity $\zeta_C$, the slip state can be determined as follows:

when the dimensionless quantity $\zeta_2 > \zeta_C$, the slip state is the elastic slip state;

when the dimensionless quantity $\zeta_2 = \zeta_C$, the slip state is the adhesion limit; and when the dimensionless quantity $\zeta_2 < \zeta_C$, the slip state is the sliding slip state, where $\zeta_C$ is a value that varies depending on the design specifications. In FIG. 5, numerical values of $\zeta_2$ and the friction damping coefficient $c_T$ are exemplarily shown in the case where $\zeta_C$ is 0.86. Once the dimensionless quantity $\zeta_C$ is known, the friction damping coefficient $c_T$ when the slip state becomes the elastic slip limit can be acquired from the formula 8.

Next, description will be made of a significance of calculating the amplitude ratio m and the phase delay $\Psi_1$ by using, as the tire driving radius R, the effective rolling radius ERR in the region in which the relationship between the dynamic load radius DLR and the effective rolling radius ERR is linear. The dynamic load radius DLR tends to be influenced by the vertical load and the tire air pressure. Therefore, the driving radius R of the tire T influences the friction torque $T_f$ that occurs on the ground contact surface, and also influences the friction damping coefficient $c_T$ and the tire torsional stiffness $k_T$.

In the following, a result of measuring the dynamic load radius DLR and the effective rolling radius ERR by using a flat-belt type tire tester is shown. The flat-belt type tire tester includes a rotatable, endless flat belt and a wheel supporting part that supports the central axis of the wheel and supports the wheel on the flat belt. The wheel supporting part can impart an arbitrary vertical load to the wheel. In the test, the dynamic load radius DLR and the effective rolling radius ERR were measured while the vertical load, the air pressure of the tire T (tire air pressure), and the vehicle speed were changed. The vertical load was changed from 500 N to 6500 N at an interval of 500 N interval. The vehicle speed was changed from 20 kph to 80 kph. The tire air pressure was 200 kPa, 240 kPa, and 280 kPa. The dynamic load radius DLR was obtained by measuring the distance between the central axis of the wheel and the upper surface of the flat belt. The effective rolling radius ERR was obtained by acquiring a travel distance per one rotation of the wheel based on the vehicle speed and the wheel rotation speed and dividing the travel distance per one rotation of the wheel by $2\pi$.

Figure 7:
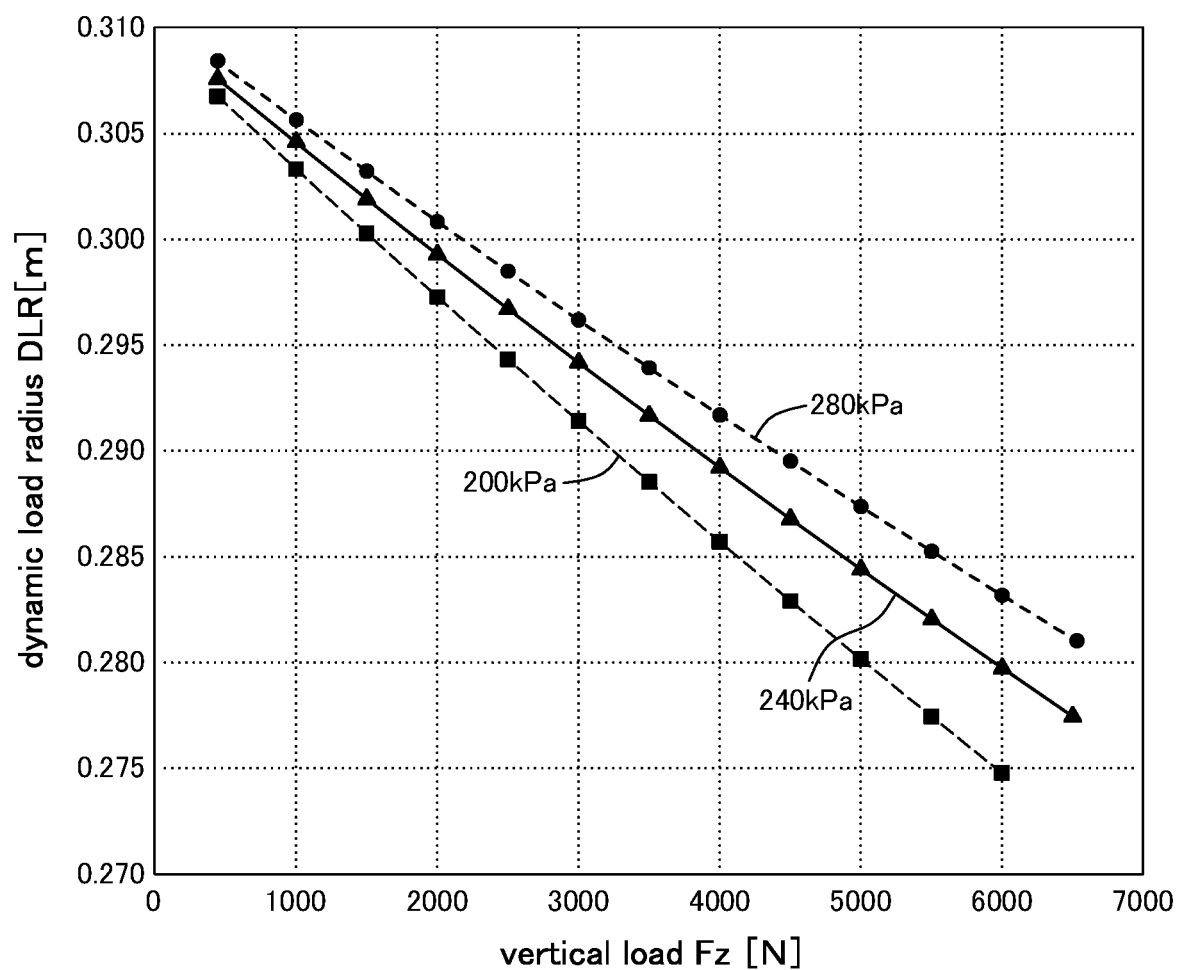
FIG. 7 is a graph in which the X axis represents a vertical load Fz and the Y axis represents a dynamic load radius DLR.
Figure 8:
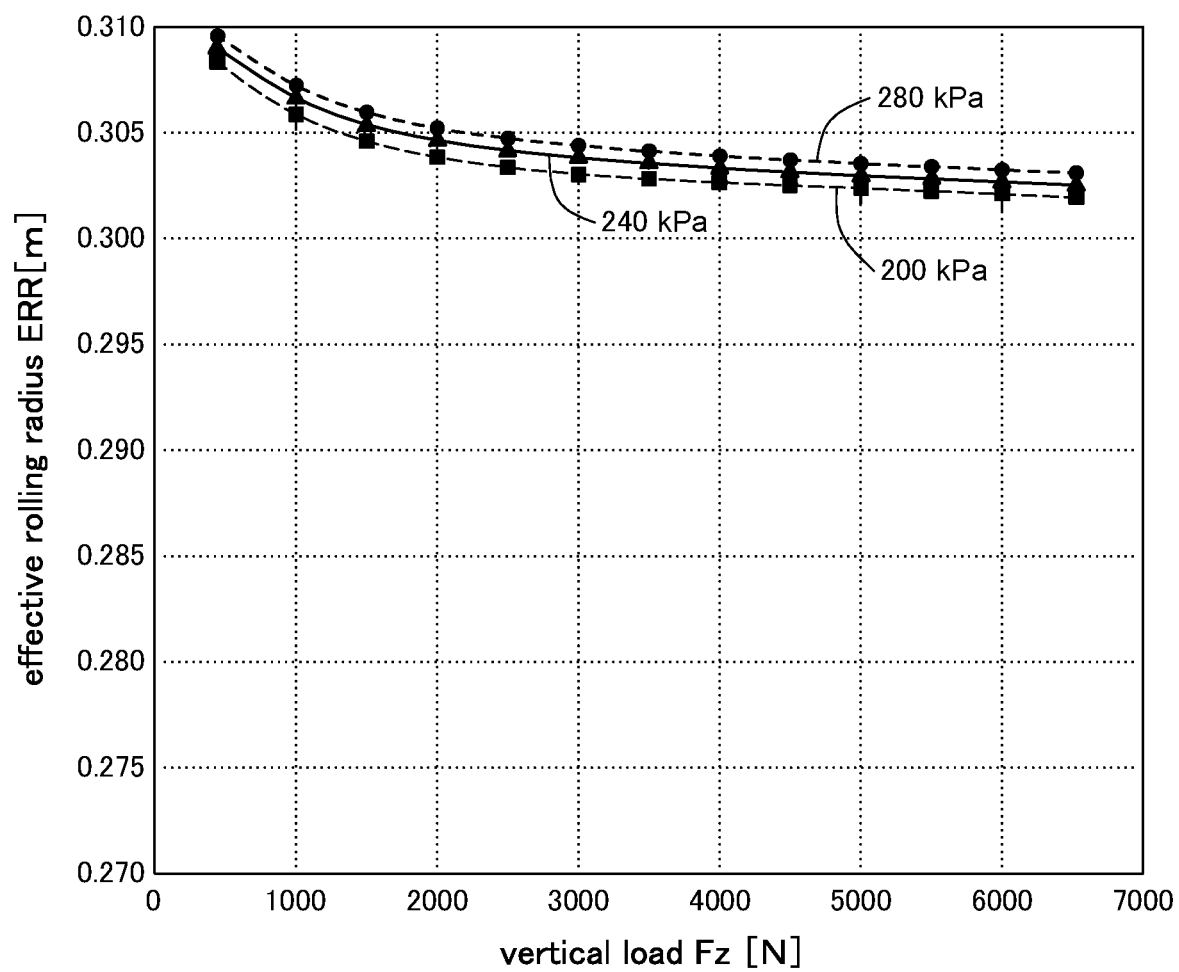
FIG. 8 is a graph in which the X axis represents the vertical load Fz and the Y axis represents an effective rolling radius ERR.

FIG. 7 is a graph in which the X axis represents a vertical load Fz [N] and the Y axis represents the dynamic load radius DLR [m]. FIG. 8 is a graph in which the X axis represents the vertical load Fz [N] and the Y axis represents the effective rolling radius ERR [m]. In FIGS. 7 and 8, the vehicle speed is all 80 kph, and the air pressure of the tire T is 200 kPa, 240 kPa, and 280 kPa. From FIG. 7, it is seen that as the vertical load Fz increases, the dynamic load radius DLR decreases. It is also seen that as the tire air pressure decreases, the dynamic load radius DLR decreases. Similarly, from FIG. 8, it is seen that as the vertical load Fz increases, the effective rolling radius ERR decreases. It is also seen that as the tire air pressure decreases, the effective rolling radius ERR decreases. From FIGS. 7 and 8, it is seen that the effective rolling radius ERR and the dynamic load radius DLR have different values even when the vertical load Fz, the vehicle speed, and the tire air pressure are the same. Also, it is seen that the rate of change of the effective rolling radius ERR with respect to the vertical load is smaller than the rate of change of the dynamic load radius DLR with respect to the vertical load. Therefore, it is seen that the effective rolling radius ERR is less influenced by the vertical load and the tire air pressure than the dynamic load radius DLR is.

Figure 9:
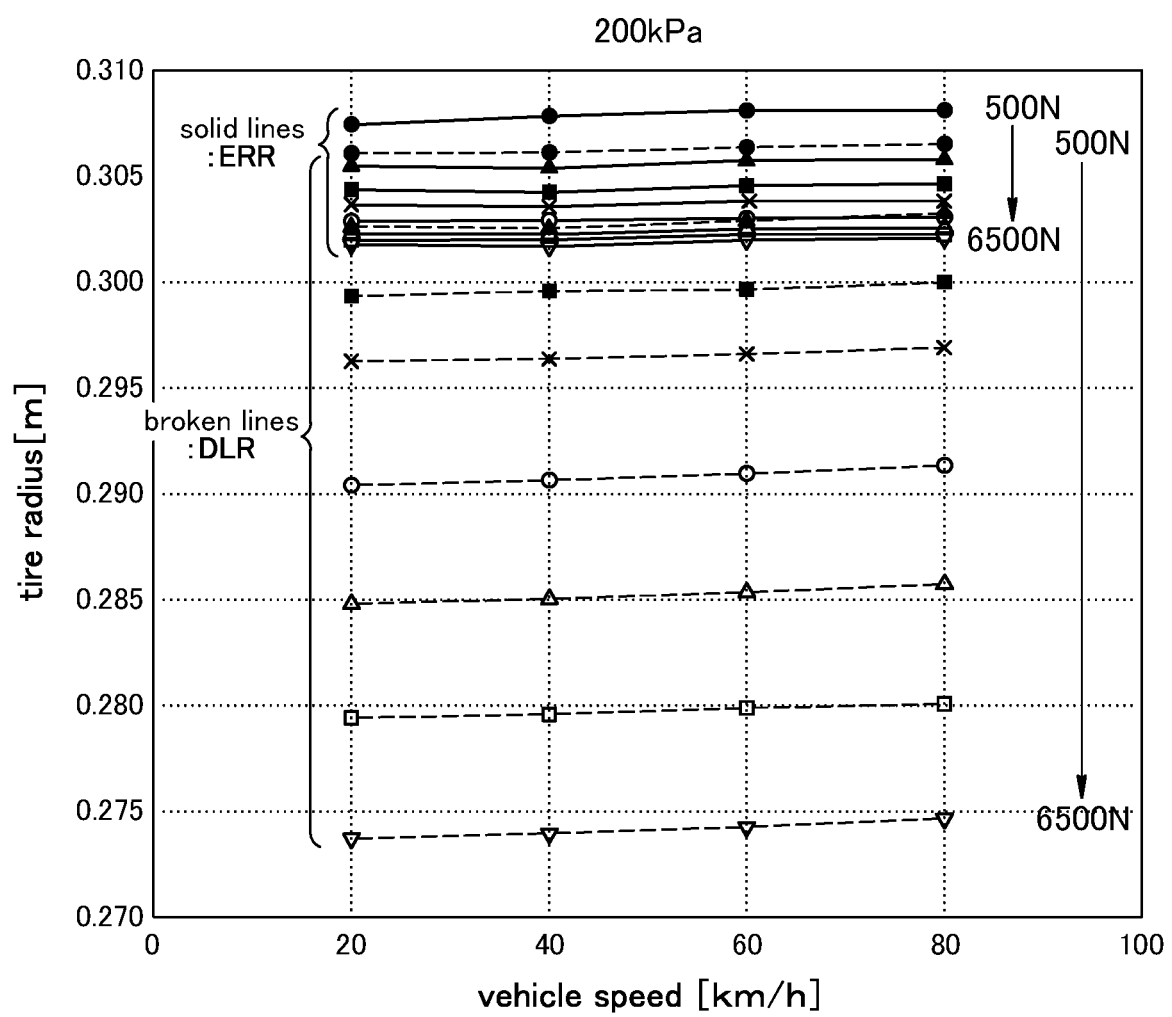
FIG. 9 is a graph in which the X axis represents a vehicle speed and the Y axis represents a tire radius, with the tire air pressure at 200 kPa.
Figure 10:
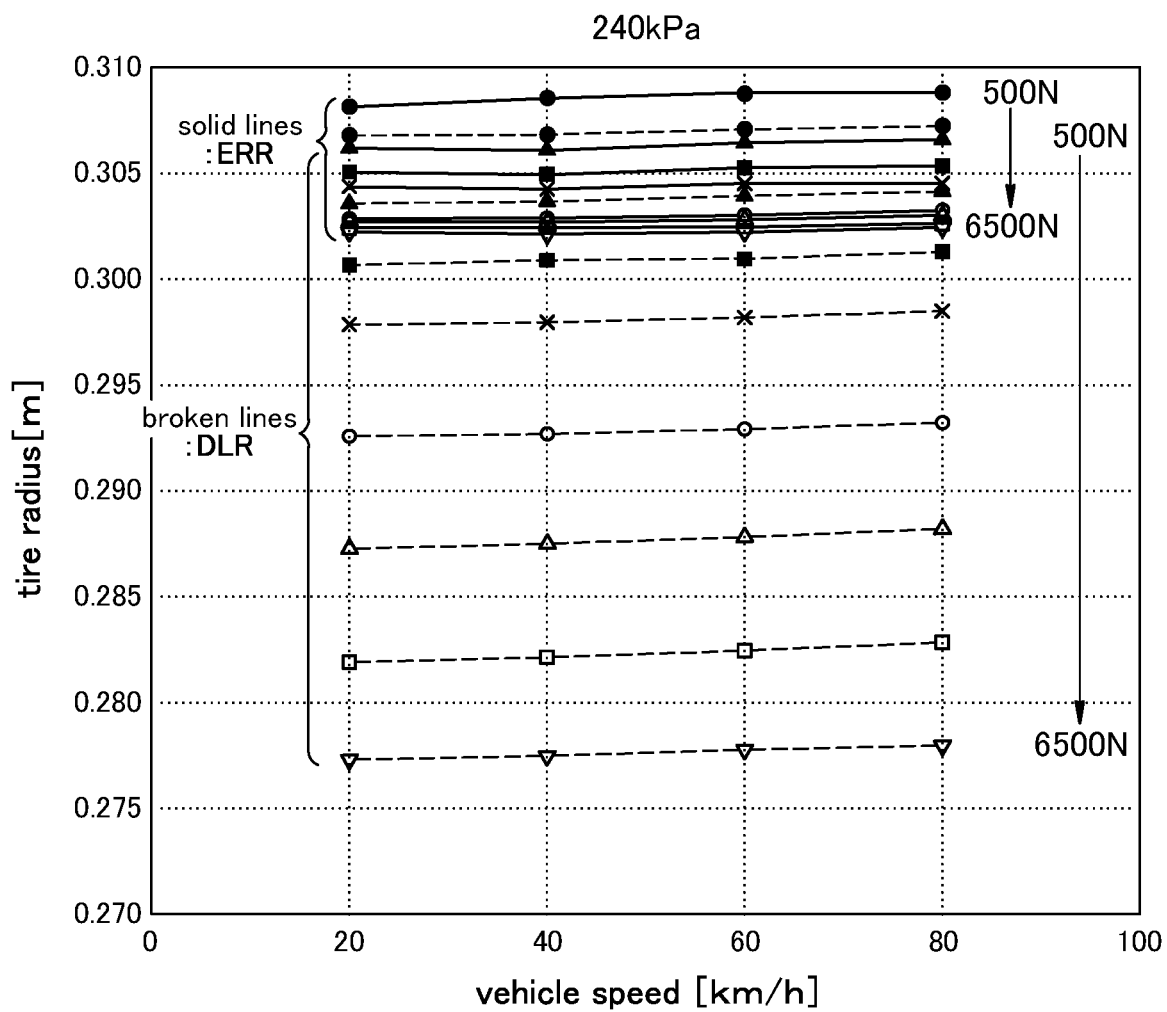
FIG. 10 is a graph in which the X axis represents the vehicle speed and the Y axis represents the tire radius, with the tire air pressure at 240 kPa.
Figure 11:
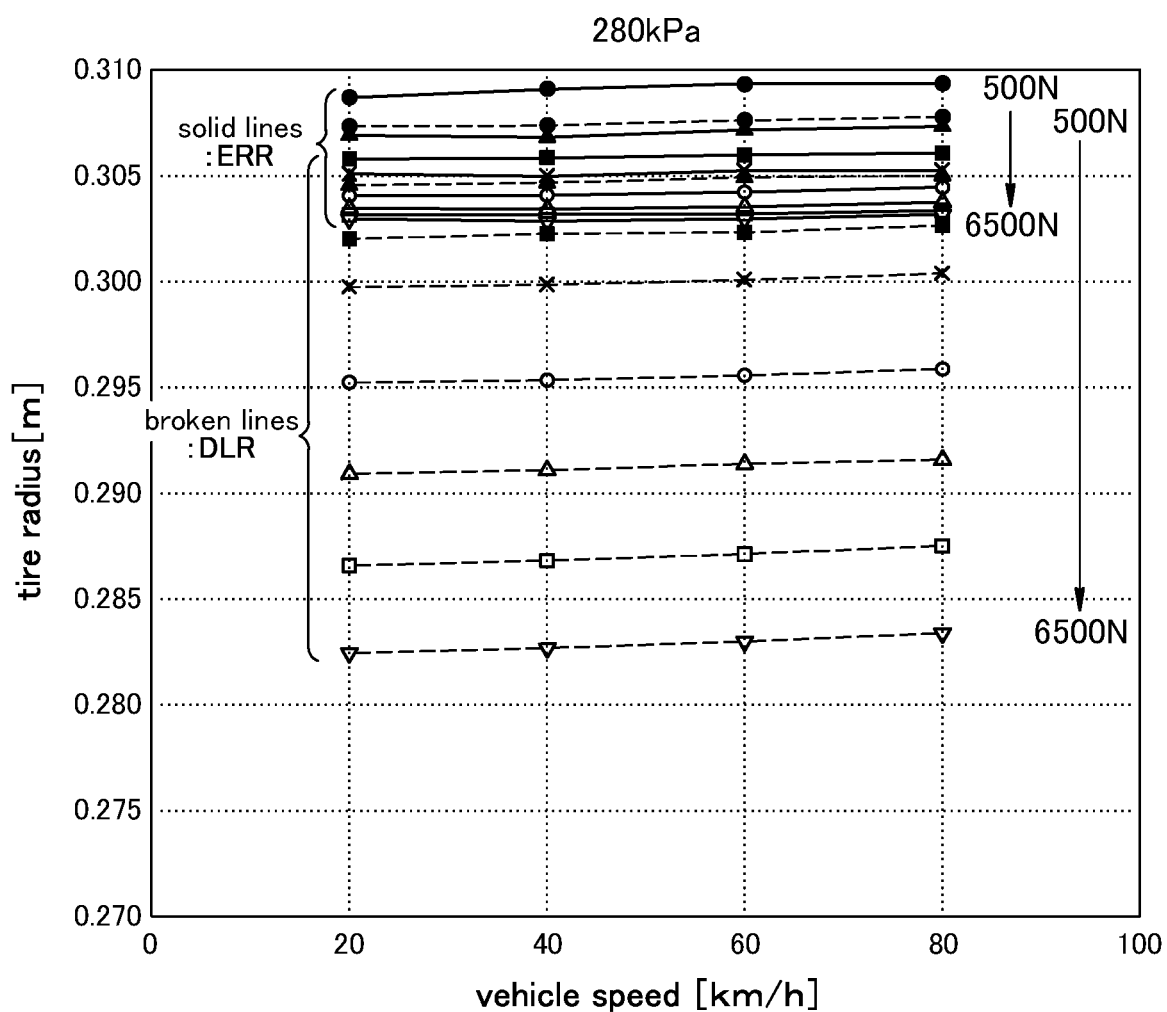
FIG. 11 is a graph in which the X axis represents the vehicle speed and the Y axis represents the tire radius, with the tire air pressure at 280 kPa.

FIG. 9 is a graph in which the X axis represents the vehicle speed [km/h] and the Y axis represents the tire radius [m], with the tire air pressure at 200 kPa. FIG. 10 is a graph in which the X axis represents the vehicle speed [km/h] and the Y axis represents the tire radius [m], with the tire air pressure at 240 kPa. FIG. 11 is a graph in which the X axis represents the vehicle speed [km/h] and the Y axis represents the tire radius [m], with the tire air pressure at 280 kPa. From FIGS. 9 to 11, it is seen that as the vehicle speed increases, the effective rolling radius ERR and the dynamic load radius DLR increase. It is also seen that the effective rolling radius ERR is greater than the dynamic load radius DLR when the vertical load, the tire air pressure, and the vehicle speed are the same. If the vertical load is changed from 500 N to 6500 N when the tire air pressure and the vehicle speed are constant, the effective rolling radius ERR decreases by about 2%. On the other hand, if the vertical load is changed from 500 N to 6500 N when the tire air pressure and the vehicle speed are constant, the dynamic load radius DLR decreases by about 8 to 17%.

Figure 12:
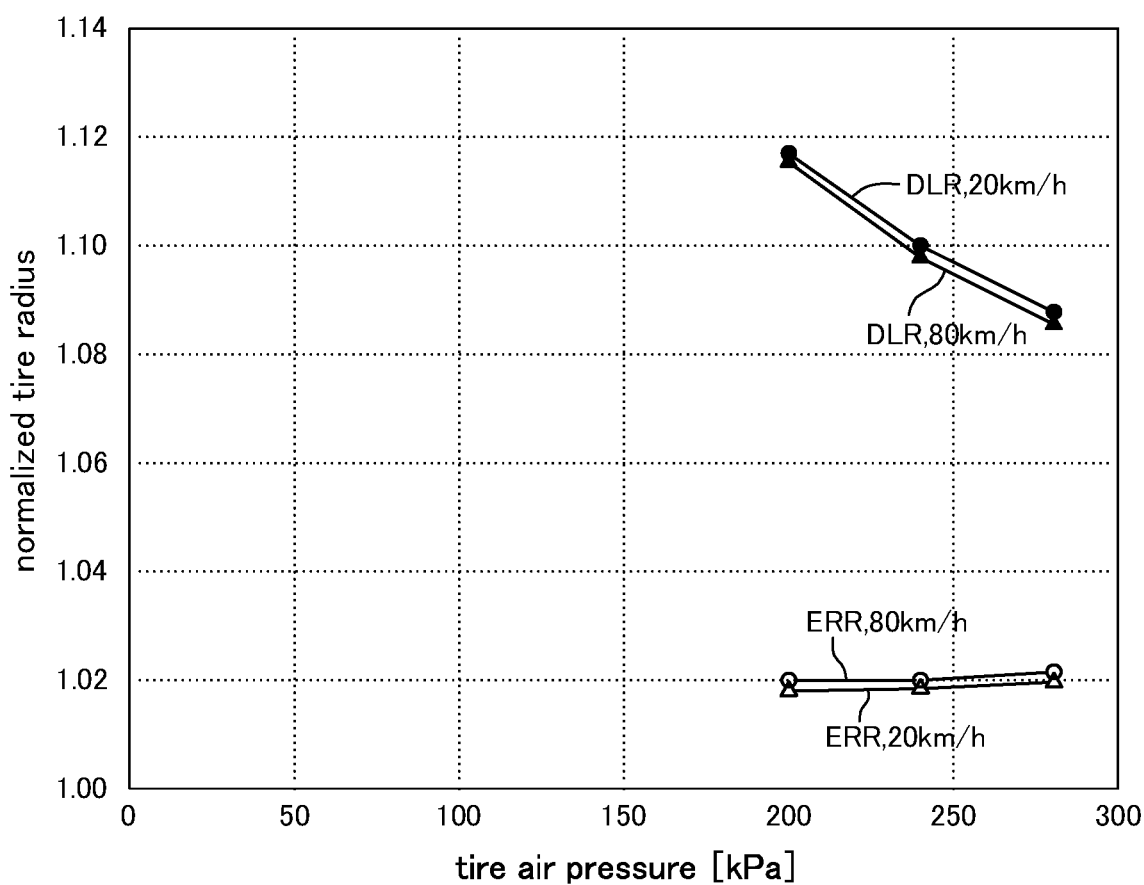
FIG. 12 is a graph in which the X axis represents the tire air pressure and the Y axis represents the tire radius when the vertical load is 500 N normalized by the tire radius when the vertical load is 6500 N.

FIG. 12 is a graph in which the X axis represents the tire air pressure [Pa] and the Y axis represents the tire radius when the vertical load is 500 N normalized by the tire radius when the vertical load is 6500 N (namely, the ratio of the tire radius when the vertical load is 500 N to the tire radius when the vertical load is 6500 N). Specifically, FIG. 12 shows the effective rolling radius ERR and the dynamic load radius DLR when the vertical load is 500 N normalized by the respective radiuses when the vertical load is 6500 N in cases where the vehicle speed is 20 km/h and where the vehicle speed is 80 km/h. As seen from FIG. 12, when the tire air pressure changes from 200 kPa to 280 kPa, an amount of change of the normalized effective rolling radius ERR is smaller than an amount of change of the normalized dynamic load radius DLR. The ratio of change of the effective rolling radius ERR is less than or equal to 1%. From the foregoing, it is seen that the effective rolling radius ERR is less influenced by the tire air pressure than the dynamic load radius DLR is.

Figure 13:
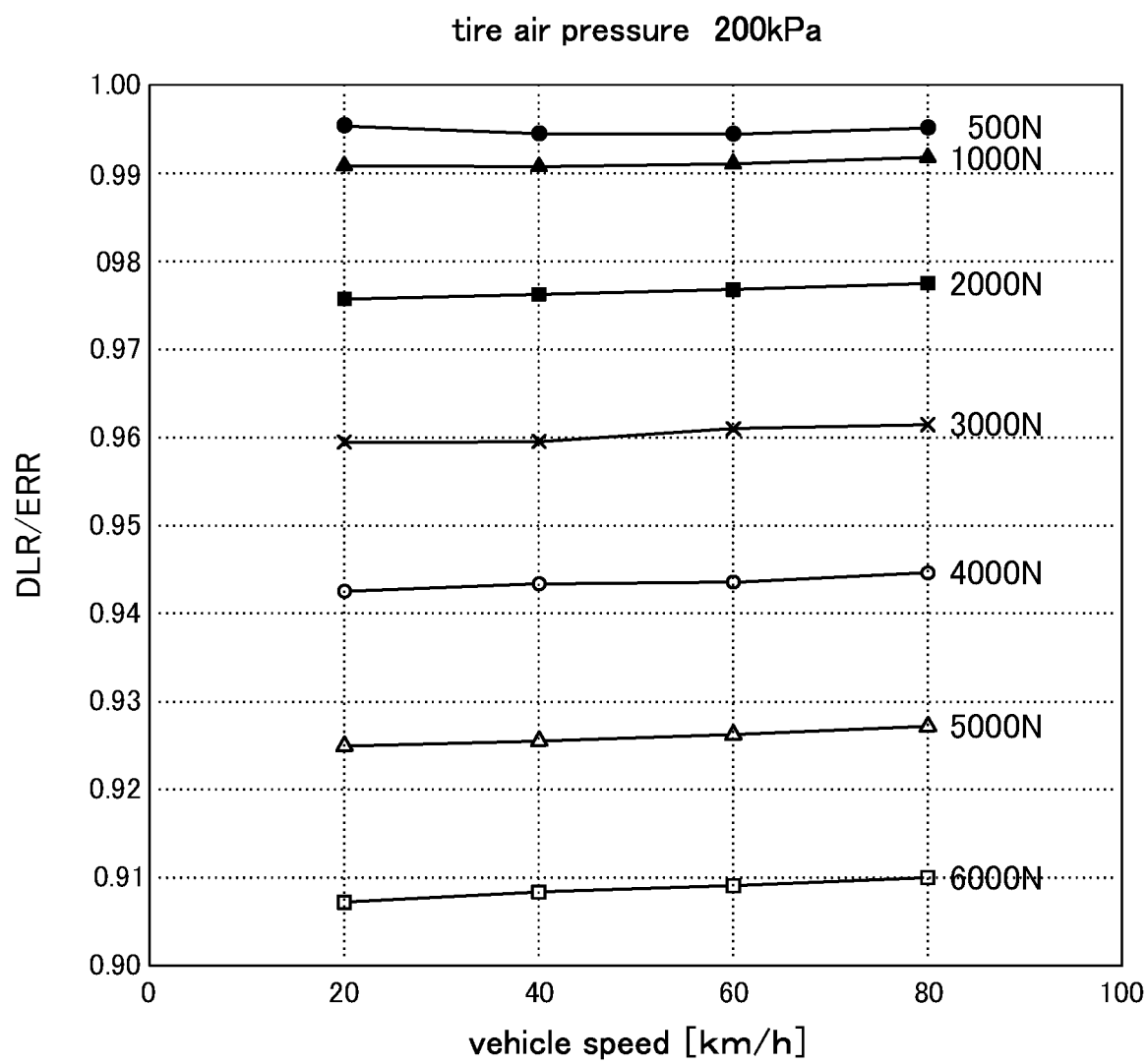
FIG. 13 is a graph in which the X axis represents the vehicle speed and the Y axis represents DLR/ERR, with the tire air pressure at 200 kPa.
Figure 14:
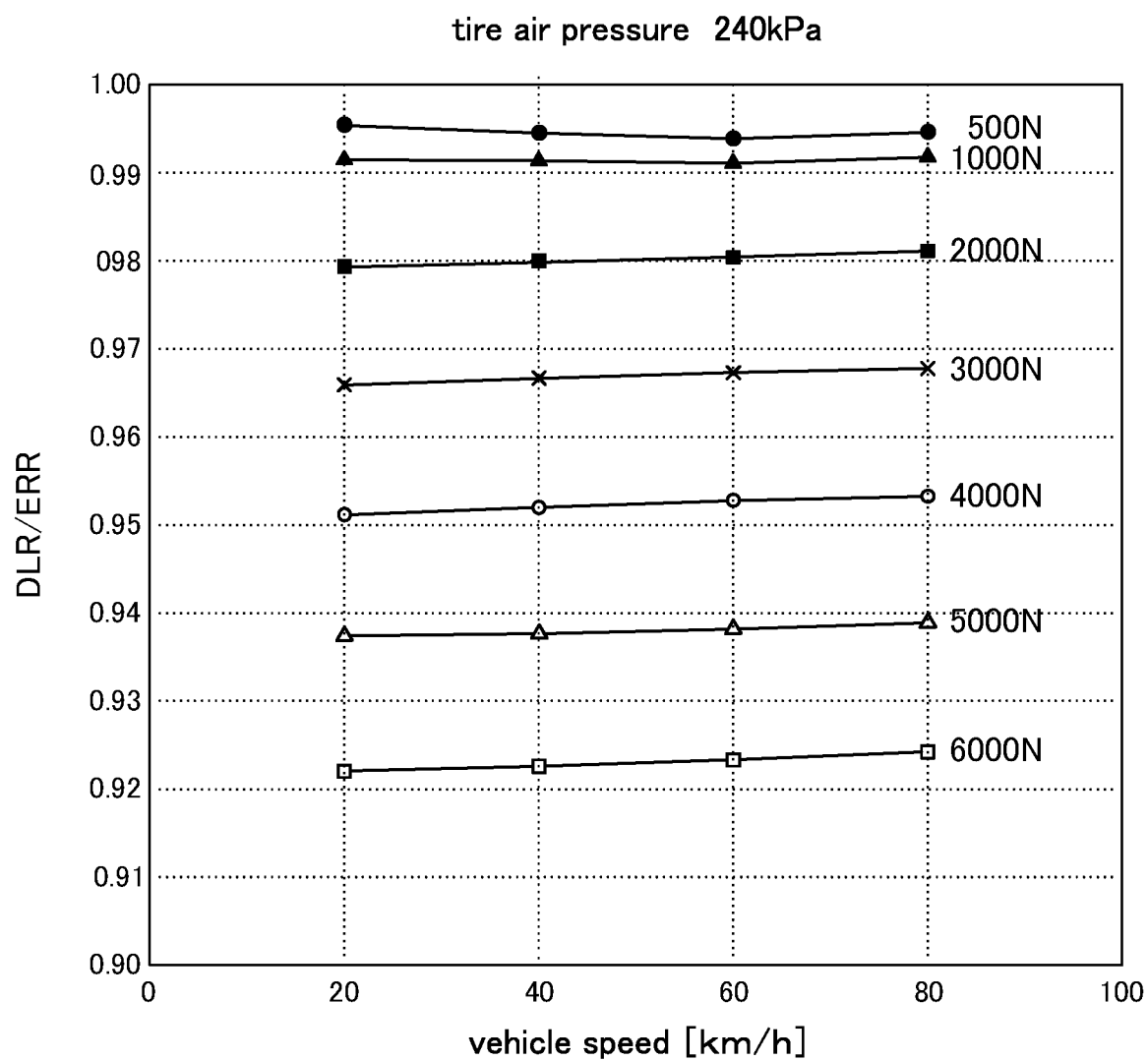
FIG. 14 is a graph in which the X axis represents the vehicle speed and the Y axis represents DLR/ERR, with the tire air pressure at 240 kPa.
Figure 15:
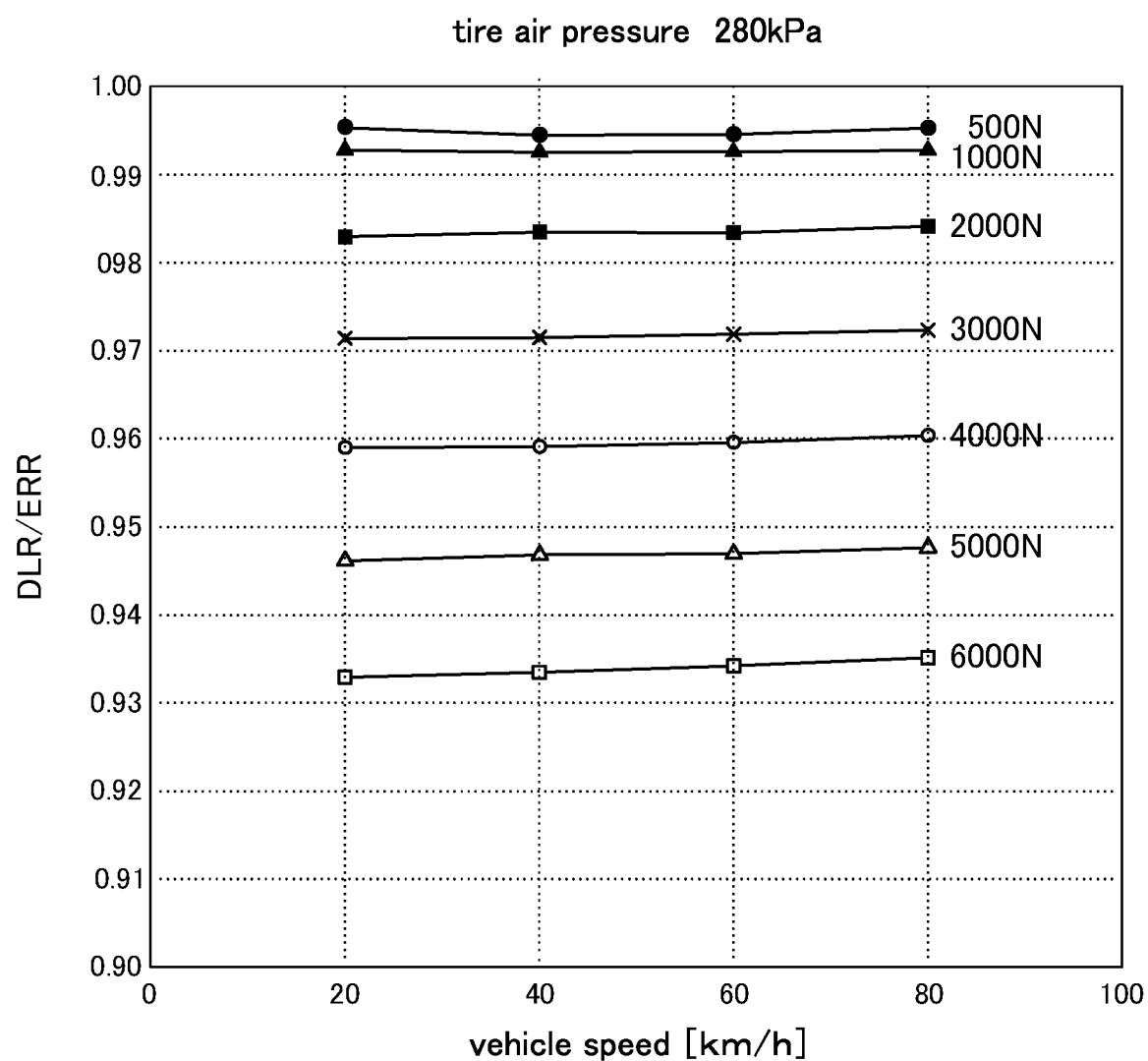
FIG. 15 is a graph in which the X axis represents the vehicle speed and the Y axis represents DLR/ERR, with the tire air pressure at 280 kPa.

FIG. 13 is a graph in which the X axis represents the vehicle speed [km/h] and the Y axis represents DLR/ERR, with the tire air pressure at 200 kPa. FIG. 14 is a graph in which the X axis represents the vehicle speed [km/h] and the Y axis represents DLR/ERR, with the tire air pressure at 240 kPa. FIG. 15 is a graph in which the X axis represents the vehicle speed [km/h] and the Y axis represents DLR/ERR, with the tire air pressure at 280 kPa. DLR/ERR is a ratio of the dynamic load radius DLR to the effective rolling radius ERR. From FIGS. 13 to 15, it is seen that the larger the vertical load is, the larger the difference between the effective rolling radius ERR and the dynamic load radius DLR is.

From FIGS. 7 to 15, it is seen that the effective rolling radius ERR is less influenced by the vertical load, the tire air pressure, and the vehicle speed than the dynamic load radius DLR is. When the vertical load changes from 500 N to 6500 N while the tire air pressure and the vehicle speed are constant, the effective rolling radius ERR decreases by about 2%. On the other hand, when the vertical load changes from 500 N to 6500 N while the tire air pressure and the vehicle speed are constant, the dynamic load radius DLR decreases by about 8 to 17%. In the elastic slip region, since the slip ratio is about 10%, if the detection error of the slip ratio becomes 10% or higher, it becomes difficult to detect the elastic slip region. Since the ratio of change of the effective rolling radius ERR is 2% under the use condition of the tire, the effective rolling radius ERR can be used in the detection of the tire slip ratio in the elastic slip region. The effective rolling radius ERR can improve the detection accuracy of the tire slip ratio than the dynamic load radius DLR.

Figure 16:
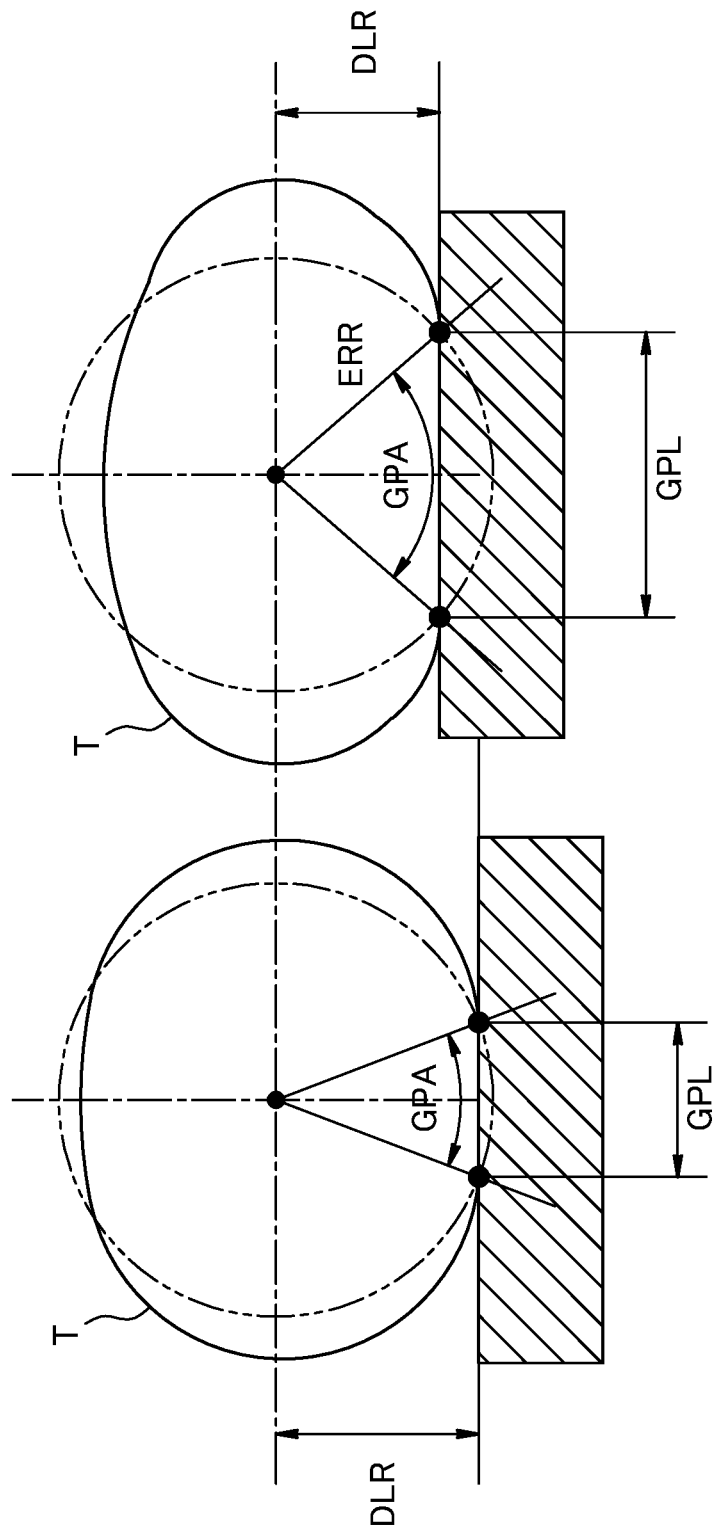
FIG. 16 is an explanatory diagram showing a shape change of the tire corresponding to a change in the vertical load.

FIG. 16 is an explanatory diagram showing a shape change of the tire corresponding to a change in the vertical load. As shown in FIG. 16, when the vertical load is increased, the tire T is pressed against the road surface, and the tire contracts in the vertical direction and expands in the horizontal direction. As a result, a ground contact surface length GPL, which is the length of the ground contact surface between the tire T and the road surface, becomes long. Also, a ground contact angle GPA is defined as an angle formed between a first line segment that passes the front end of the ground contact surface in the front-rear direction (wheel rotation direction) and the central axis of the wheel and a second line segment that passes the rear end of the ground contact surface and the central axis of the wheel. The length of each of the first line segment and the second line segment corresponds to the effective rolling radius ERR. The ground contact angle GPA increases as the vertical load increases. Here, the ground contact surface length GPL and the ground contact angle GPA are expressed as follows by using the effective rolling radius ERR and the dynamic load radius DLR.

$$GPL = 2*(ERR^2 - DLR^2)^{1/2}$$

$$GPA = 2*\cos^{-1}(DLR/ERR)$$

Figure 17:
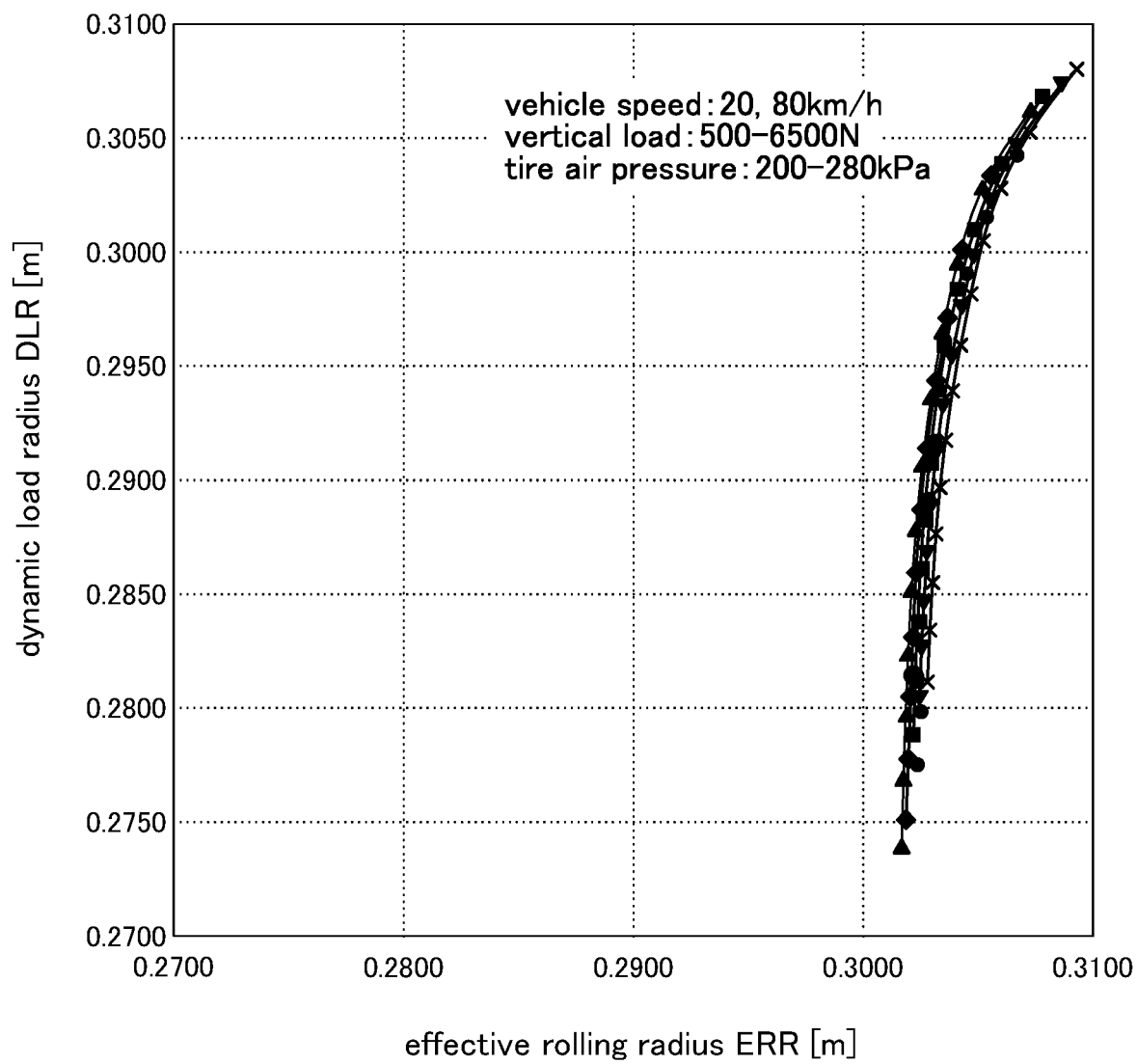
FIG. 17 is a graph showing a relationship between the effective rolling radius ERR and the dynamic load radius DLR.

FIG. 17 is a graph showing a relationship between the effective rolling radius ERR and the dynamic load radius DLR. In FIG. 17, the vehicle speed is 20 km/h or 80 km/h, the tire air pressure is 200 kPa, 240 kPa, or 280 kPa, and the vertical load is 500 N to 6500 N. From FIG. 17, it is seen that the effective rolling radius ERR and the dynamic load radius DLR have low correlation. Also, an amount of change of the effective rolling radius ERR is smaller than an amount of change of the dynamic load radius DLR.

Figure 18:
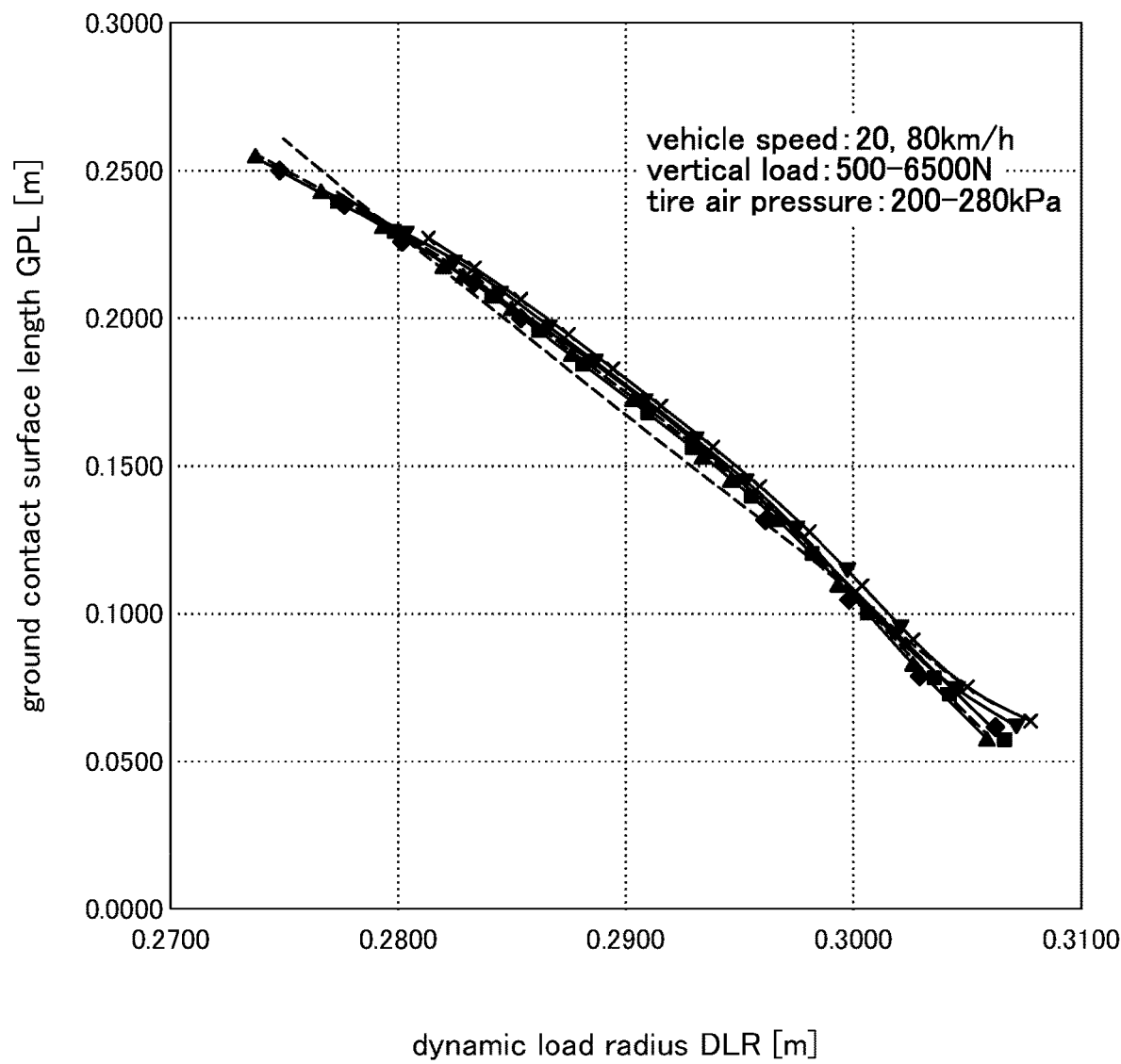
FIG. 18 is a graph showing a relationship between the dynamic load radius DLR and a ground contact surface length GPL.

FIG. 18 is a graph showing a relationship between the dynamic load radius DLR and the ground contact surface length GPL. In FIG. 18, the vehicle speed is 20 km/h or 80 km/h, the tire air pressure is 200 kPa, 240 kPa, or 280 kPa, and the vertical load is 500 N to 6500 N. From FIG. 18, it is seen that the dynamic load radius DLR and the ground contact surface length GPL have first-order correlation. The correlation coefficient between the dynamic load radius DLR and the ground contact surface length GPL is 0.99 or higher.

Figure 19:
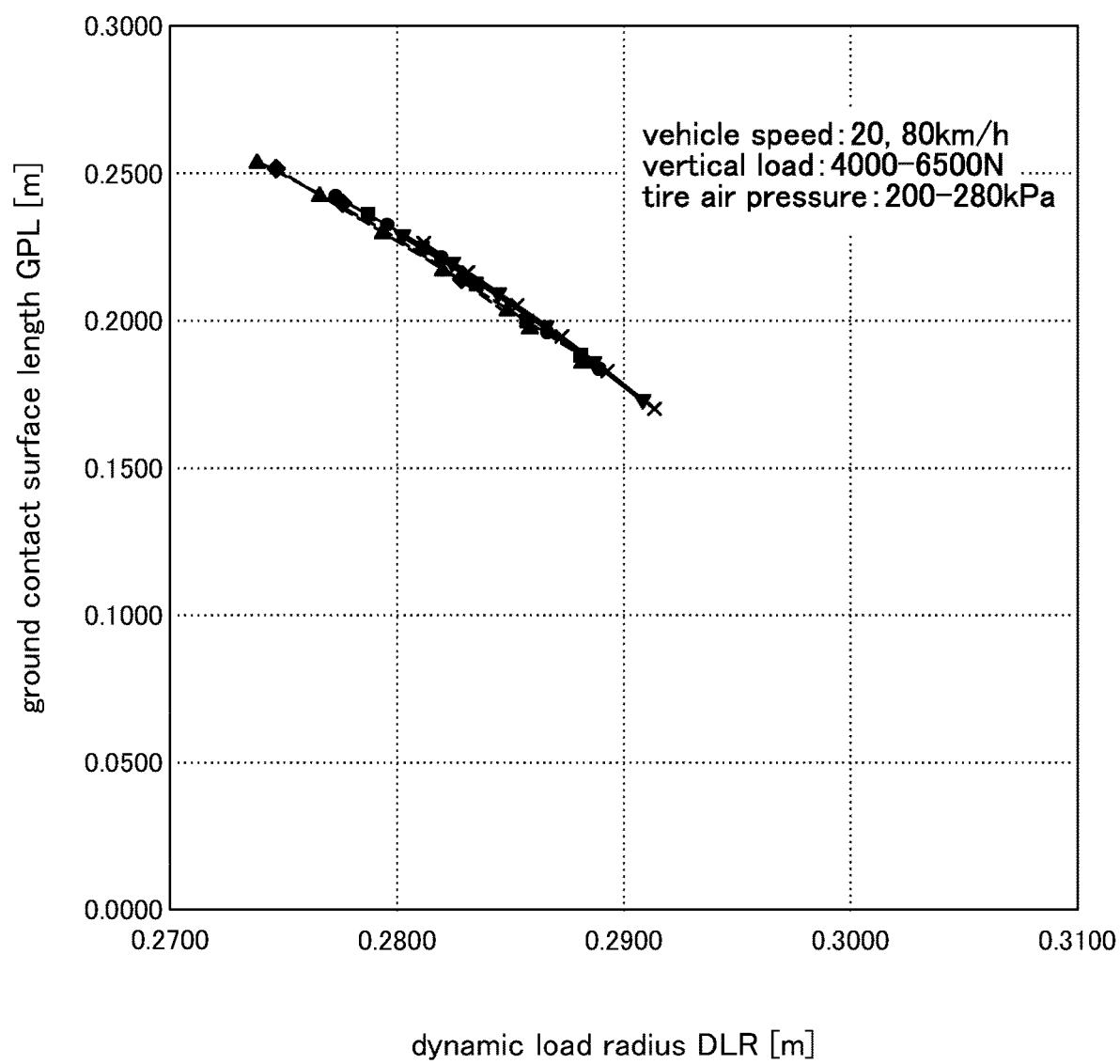
FIG. 19 is a graph showing a relationship between the dynamic load radius DLR and the ground contact surface length GPL.

FIG. 19 is a graph showing a relationship between the dynamic load radius DLR and the ground contact surface length GPL. In FIG. 19, the vehicle speed is 20 km/h or 80 km/h, the tire air pressure is 200 kPa, 240 kPa, or 280 kPa, and the vertical load is 4000 N to 6500 N. FIG. 19 is obtained by extracting, from the graph of FIG. 18, a part where the vertical load is 4000 N to 6500 N. From FIG. 19, it is seen that the dynamic load radius DLR and the ground contact surface length GPL have first-order correlation. The correlation coefficient between the dynamic load radius DLR and the ground contact surface length GPL is 0.998 or higher. The correlation coefficient between the dynamic load radius DLR and the ground contact surface length GPL when the vertical load is 4000 N to 6500 N is higher than the correlation coefficient between the dynamic load radius DLR and the ground contact surface length GPL when the vertical load is 500 N to 6500 N.

Figure 20:
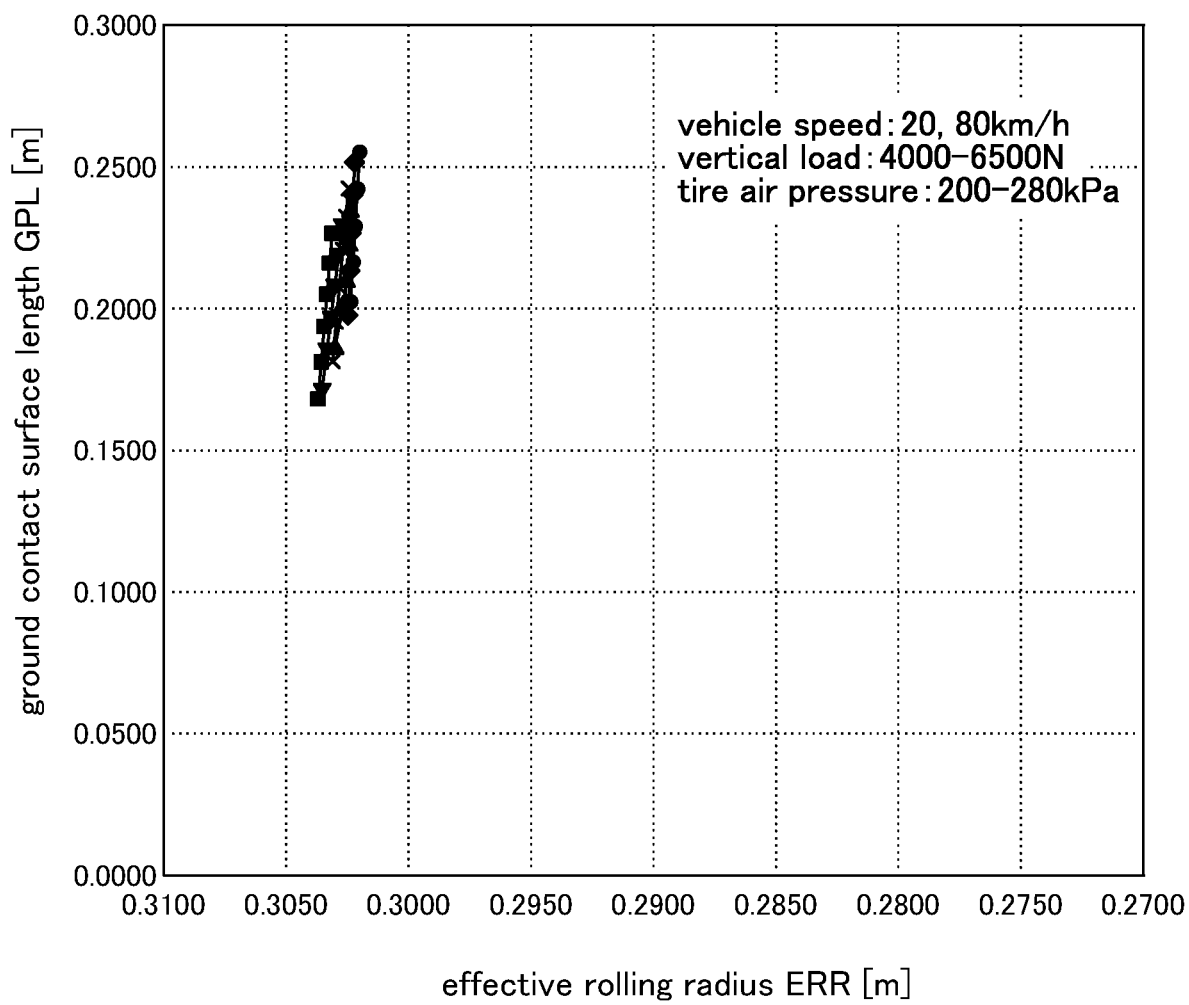
FIG. 20 is a graph showing a relationship between the effective rolling radius ERR and the ground contact surface length GPL.

FIG. 20 is a graph showing a relationship between the effective rolling radius ERR and the ground contact surface length GPL. In FIG. 20, the vehicle speed is 20 km/h or 80 km/h, the tire air pressure is 200 kPa, 240 kPa, or 280 kPa, and the vertical load is 4000 N to 6500 N. From FIG. 20, it is seen that the effective rolling radius ERR and the ground contact surface length GPL have first-order correlation. As seen from FIGS. 19 and 20, the amount of change of the effective rolling radius ERR relative to the ground contact surface length GPL is smaller than the amount of change of the dynamic load radius DLR relative to the ground contact surface length GPL.

Figure 21:
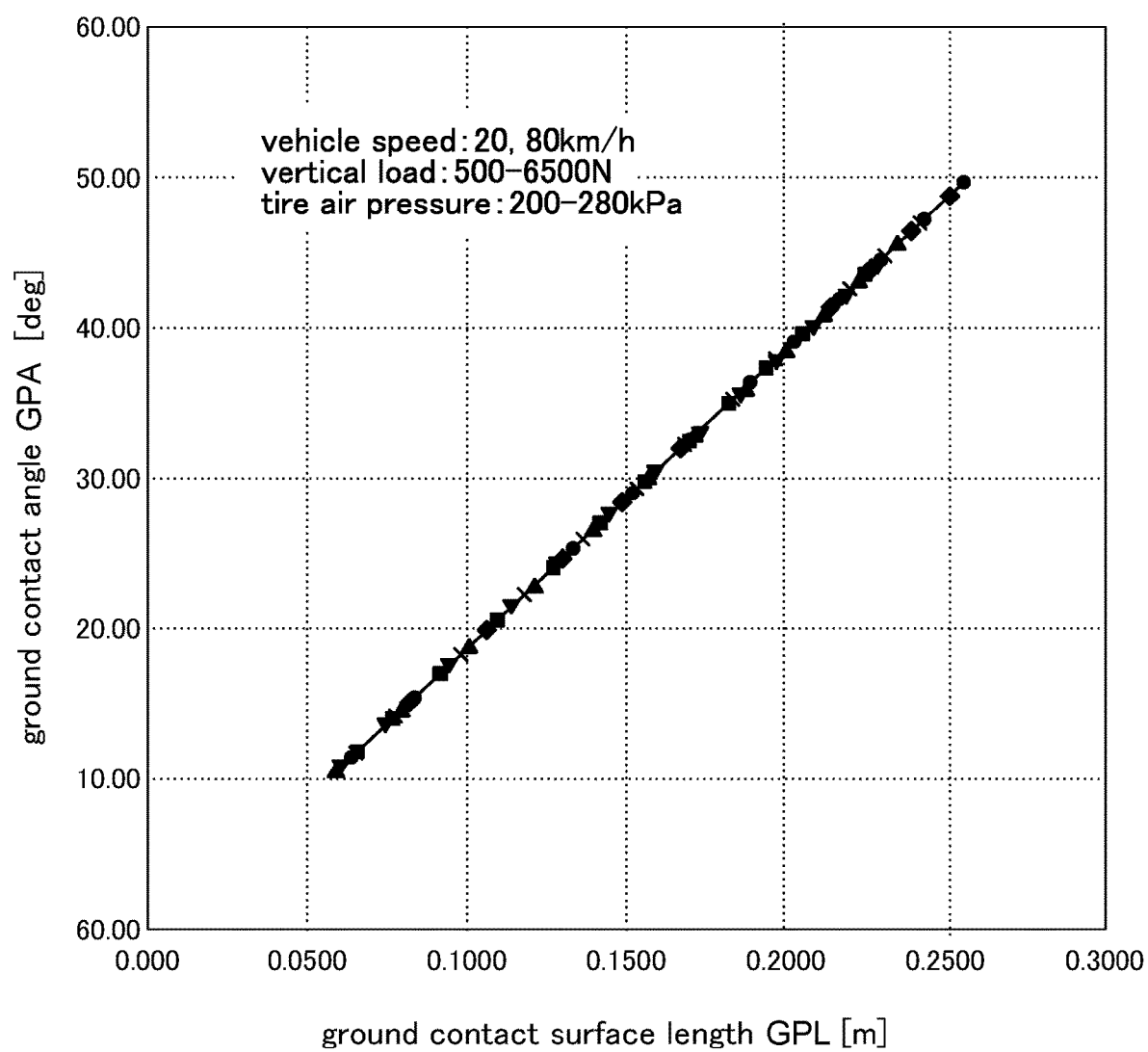
FIG. 21 is a graph showing a relationship the ground contact surface length GPL and a ground contact angle GPA.
Figure 22:
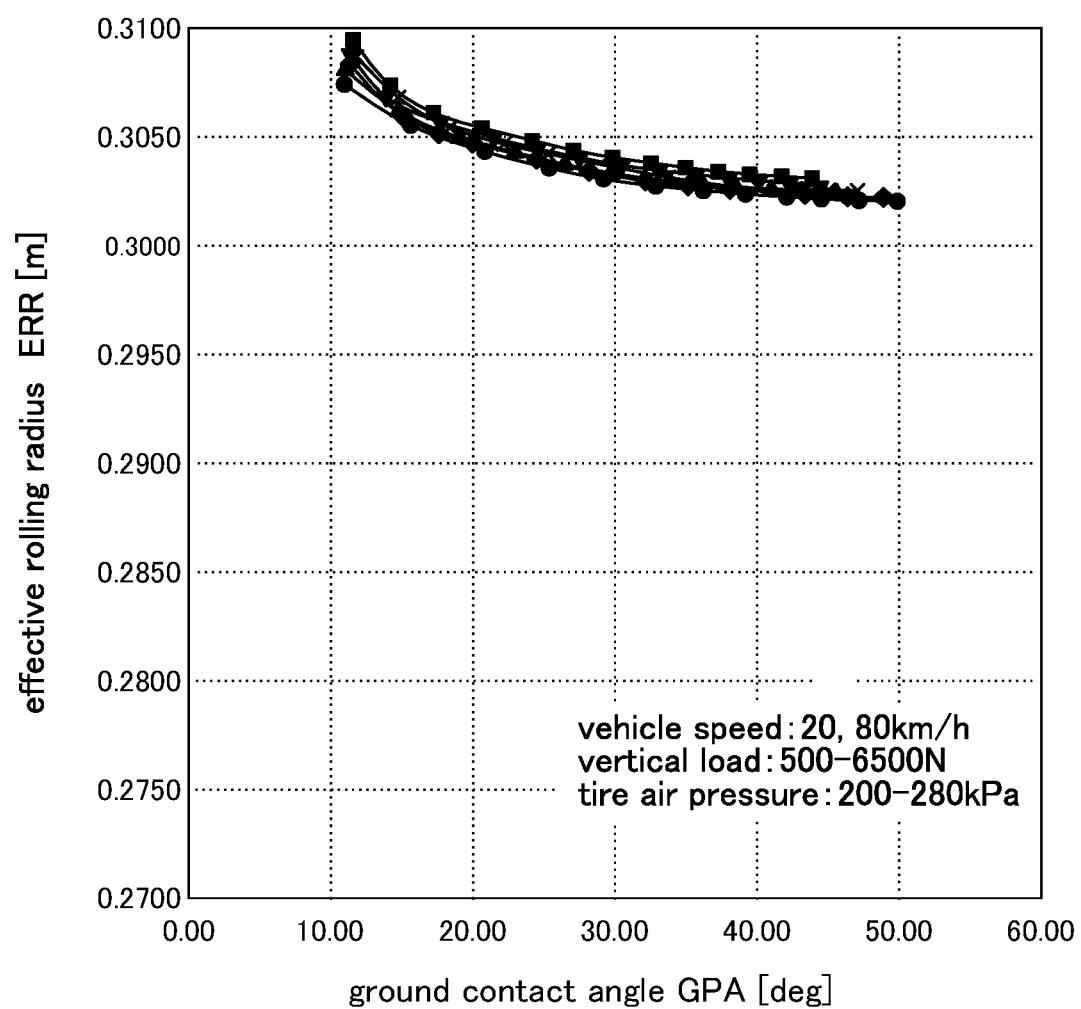
FIG. 22 is a graph showing a relationship between the ground contact angle GPA and the effective rolling radius ERR.

FIG. 21 is a graph showing a relationship between the ground contact surface length GPL and the ground contact angle GPA. From FIG. 21, it is seen that the ground contact surface length GPL and the ground contact angle GPA have first-order correlation. FIG. 22 is a graph showing a relationship between the ground contact angle GPA and the effective rolling radius ERR. From FIG. 22, it is seen that the effective rolling radius ERR decreases as the ground contact angle GPA increases, and in the region in which the ground contact angle GPA is about 30 degrees or more, the ground contact angle GPA and the effective rolling radius ERR have first-order correlation.

As seen from FIGS. 7 and 8, the ratio of change of the effective rolling radius ERR to the change of the vertical load is smaller than the ratio of change of the dynamic load radius DLR to the change of the vertical load. Therefore, by using the effective rolling radius ERR instead of the dynamic load radius DLR when calculating the amplitude ratio and the phase delay, the calculation is less influenced by the vertical load, the tire air pressure, and the vehicle speed. The ratio of change of the effective rolling radius ERR to the change of the vertical load becomes smaller as the vertical load increases. Therefore, it is preferred to use the effective rolling radius ERR in the range in which the vertical load is 2500 N to 6500 N, more preferably in the range in which the vertical load is 3500 N to 6500 N, and further preferably in the range in which the vertical load is 4000 N to 6500 N. In the case of an ordinary passenger car, the weight of the vehicle is about 1428 kg. In this case, the load applied to each of the front wheels which are driving wheels in the 1G state is about 4000 N. Therefore, it is preferred that the tire driving radius is the effective rolling radius ERR in the 1G state.

From FIG. 17, the first-order correlation coefficient between the effective rolling radius ERR and the dynamic load radius DLR when the range of the vertical load is 500 N to 6500 N is about 0.82. On the other hand, the first-order correlation coefficient between the effective rolling radius ERR and the dynamic load radius DLR when the range of the vertical load is 2500 N to 6500 N is about 0.96. It is also seen that in the region in which the first-order correlation coefficient between the effective rolling radius ERR and the dynamic load radius DLR is high, the effective rolling radius ERR changes a little even if the dynamic load radius DLR changes greatly.

Figure 23:
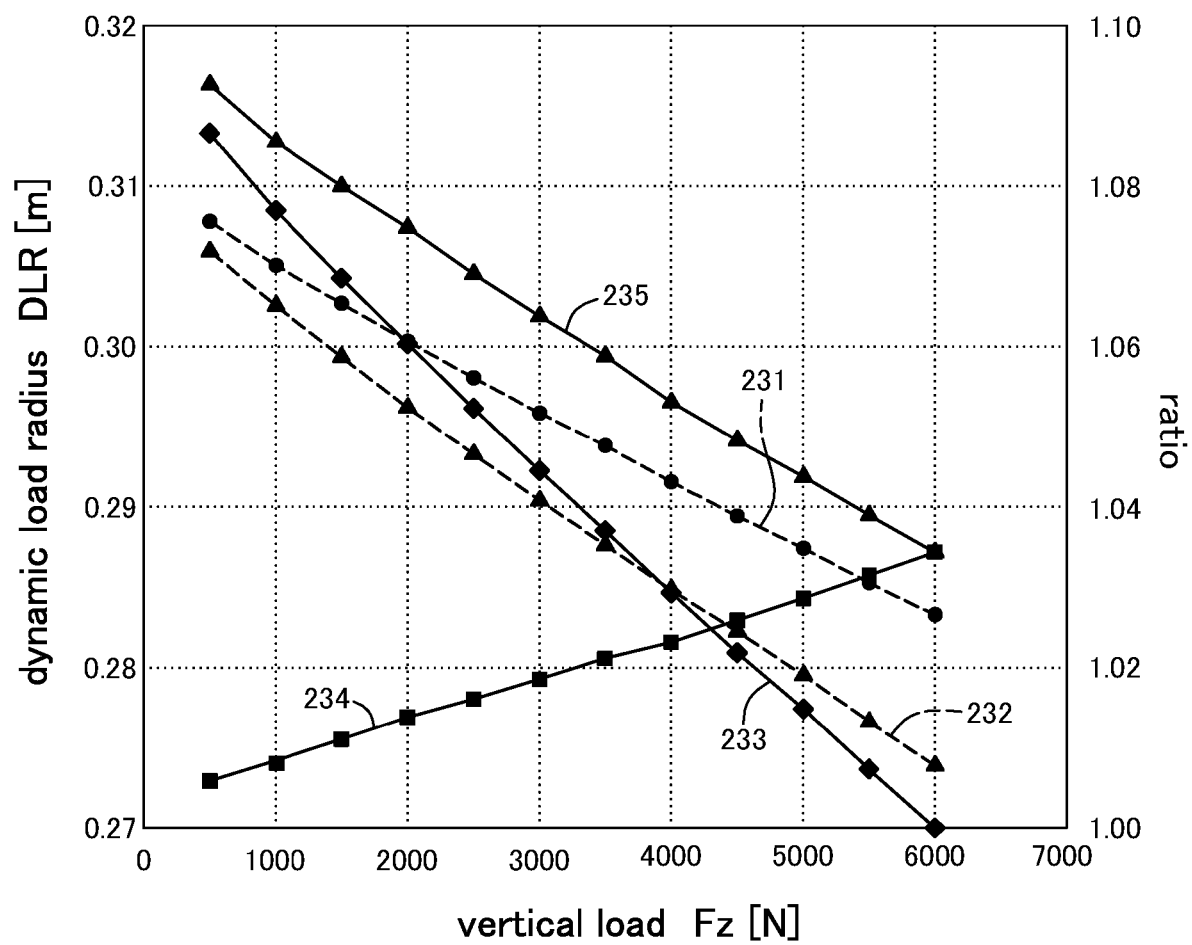
FIG. 23 is a graph in which the X axis represents the vertical load, the first Y axis represents the dynamic load radius DLR, and the second Y axis represents ratios.

FIG. 23 is a graph in which the X axis represents the vertical load, the first Y axis represents the dynamic load radius DLR, and the second Y axis represents ratios. The curve 231 in FIG. 23 represents the dynamic load radius DLR when the tire air pressure is 280 kPa and the vehicle speed is 80 km/h. The curve 232 in FIG. 23 represents the dynamic load radius DLR when the tire air pressure is 200 kPa and the vehicle speed is 20 km/h. The curve 233 in FIG. 23 represents the dynamic load radius DLR when the tire air pressure is 280 kPa and the vehicle speed is 80 km/h normalized by the dynamic load radius DLR when the vertical load is 6000 N (or the ratio of the dynamic load radius DLR represented by the curve 231 to the dynamic load radius DLR when the vertical load is 6000 N). The curve 234 in FIG. 23 represents the ratio of the curve 231 to the curve 232. The curve 235 in FIG. 23 represents a value obtained by multiplying the curve 233 by the curve 234 for each vertical load.

Figure 24:
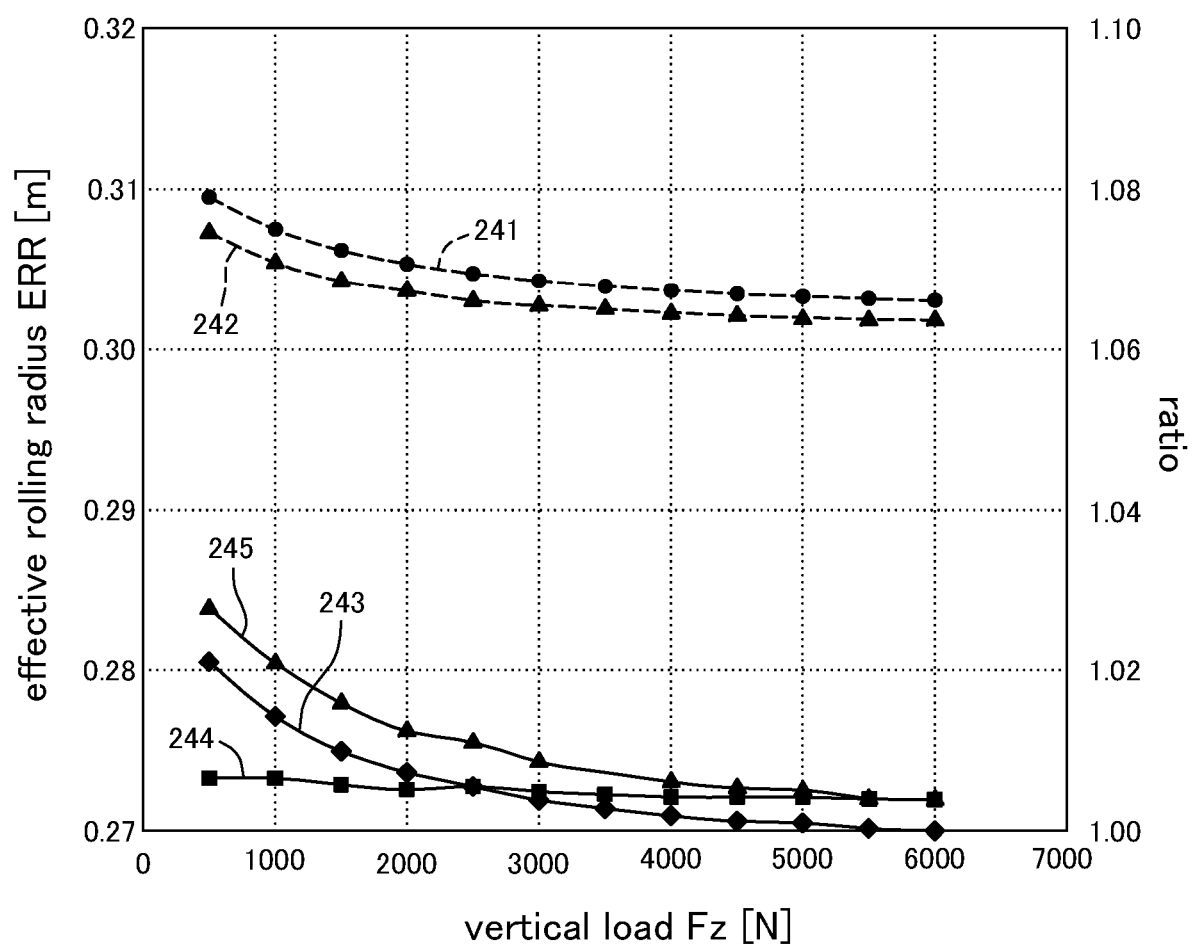
FIG. 24 is a graph in which the X axis represents the vertical load, the first Y axis represents the effective rolling radius ERR, and the second Y axis represents ratios.

FIG. 24 is a graph in which the X axis represents the vertical load, the first Y axis represents the effective rolling radius ERR, and the second Y axis represents ratios. The curve 241 in in FIG. 24 represents the effective rolling radius ERR when the tire air pressure is 280 kPa and the vehicle speed is 80 km/h. The curve 242 in FIG. 24 represents the effective rolling radius ERR when the tire air pressure is 200 kPa and the vehicle speed is 20 km/h. The curve 243 in FIG. 24 represents the effective rolling radius ERR when the tire air pressure is 280 kPa and the vehicle speed is 80 km/h normalized by the effective rolling radius ERR when the vertical load is 6000 N (or the ratio of the effective rolling radius ERR represented by the curve 241 to the effective rolling radius ERR when the vertical load is 6000 N). The curve 244 in FIG. 24 represents the ratio of the curve 241 to the curve 242. The curve 245 in FIG. 24 represents a value obtained by multiplying the curve 243 by the curve 244 for each vertical load.

From FIGS. 23 and 24, it is seen that the effective rolling radius ERR is less influenced by the vertical load, the tire air pressure, and the velocity than the dynamic load radius DLR is. The larger the vertical load is, the less influence the effective rolling radius ERR receives from the vertical load, the tire air pressure, and the velocity. The ratio of change of the dynamic load radius DLR is about 5.3% in the 1G state of a general vehicle having a weight of 1428 kg (the vertical load applied to each of the front wheels which are driving wheels is 4000 N). On the other hand, the ratio of change of the effective rolling radius ERR is about 0.6% in the 1G state of a general vehicle having a weight of 1428 kg (the vertical load applied to each of the front wheels which are driving wheels is 4000 N). Therefore, by using the effective rolling radius ERR as the tire radius in the 1G state, it is possible to improve the detection accuracy of the tire slip ratio.

Figure 25:
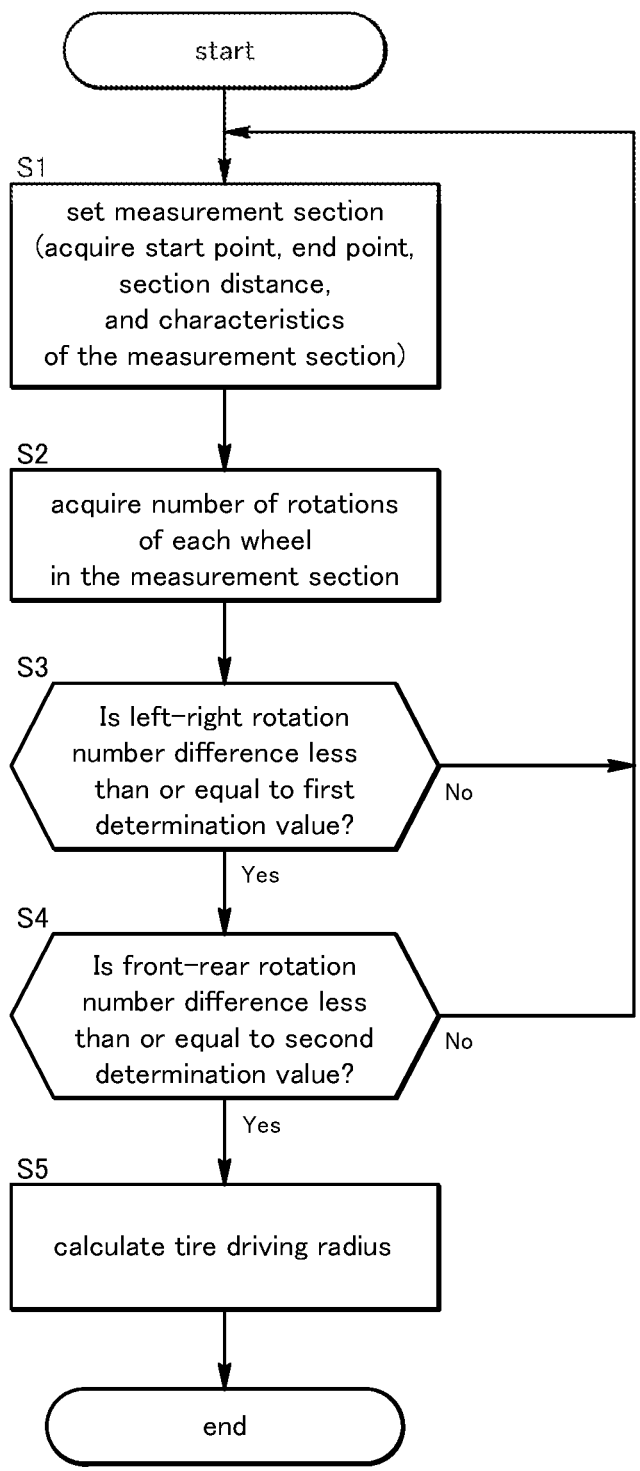
FIG. 25 is a flowchart for acquiring the tire driving radius during travel of the vehicle.

In the following, a method of acquiring the tire driving radius during travel of the vehicle will be described. FIG. 25 is a flowchart for acquiring the tire driving radius during travel of the vehicle. The procedure shown in FIG. 25 is executed by the control device 14. The control device 14 first sets a measurement section (S1). The measurement section includes a start point and an end point of the measurement section, a section distance which is a distance from the start point to the end point as measured along the road, and information related to the characteristics of the section. Preferably, the control device 14 acquires information related to the measurement section from the map information in the navigation device 15. Also, the control device 14 may acquire the section distance based on the signal from the distance sensor 12L. The characteristics of the section includes an inclination angle of the road surface. Preferably, the control device 14 acquires the characteristics of the section based on the signal from the inclination angle sensor 12M and the map information in the navigation device 15.

Next, the control device 14 acquires the number of rotations of each wheel 3 from when the start point is reached to when the end point is reached (S2).

Next, the control device 14 calculates a left-right rotation number difference, which is a difference in the number of rotations between the left and right wheels 3, based on the number of rotations of each wheel 3 acquired in step S2 and determines whether the left-right rotation number difference is less than or equal to a first determination value (S3). The left-right rotation number difference may be a difference in the number of rotations between the left and right front wheels or may be a difference in the number of rotations between the left and right rear wheels. When the left-right rotation number difference is not less than or equal to the first determination value, the control flow returns to step S1. When the left-right rotation number difference is less than or equal to the first determination value, the control flow proceeds to step S4.

In step S4, the control device 14 calculates a front-rear rotation number difference, which is a difference in the number of rotations between the driving wheel and the non-driving wheel, based on the rotation speed of each wheel 3 acquired in step S2 and determines whether the front-rear rotation number difference is less than or equal to a second determination value. The driving wheel may be a front wheel or may be a rear wheel. The number of rotations of the front wheel may be the number of rotations of one of the left and right front wheels or may be an average of the numbers of rotations of the left and right front wheels. The number of rotations of the rear wheel may be the number of rotations of one of the left and right rear wheels or may be an average of the numbers of rotations of the left and right rear wheels. When the front-rear rotation number difference is not less than or equal to the second determination value, the control flow returns to step S1. When the front-rear rotation number difference is less than or equal to the second determination value, the control flow proceeds to step S5.

In step S5, the tire driving radius is acquired based on the section distance and the number of rotations of each wheel. The tire driving radius is the effective rolling radius ERR and is calculated by dividing the section distance by a and the number of rotations of the wheel.

A concrete embodiment of the present invention has been described in the foregoing, but the present invention is not limited to the above embodiments and may be modified or altered in various ways. For example, the present invention is not limited to four-wheel vehicles but may be applied to two-wheel vehicles.

The invention claimed is:

1. A tire slip state determination method for determining a slip state of a tire of a wheel relative to a road surface, wherein the wheel is connected to a drive source via a power transmission member, the method comprising:
    detecting a rotation fluctuation of the power transmission member and a rotation fluctuation of a wheel body of the wheel;
    determining, based on an amplitude ratio of a rotation fluctuation amplitude of the wheel body to a rotation fluctuation amplitude of the power transmission member and a phase delay of the rotation fluctuation of the wheel body relative to the rotation fluctuation of the power transmission member, whether a vibration mode of the wheel body and the tire is an elastic slip mode in which the vibration mode of the wheel body and the tire represents a frequency response in an elastic slip state or a sliding slip mode in which the vibration mode of the wheel body and the tire represents a frequency response in a sliding slip state; and
    determining that the tire is in the sliding slip state when the vibration mode of the wheel body and the tire is the sliding slip mode,
    wherein the amplitude ratio and the phase delay are calculated by using, as a tire driving radius, an effective rolling radius in a region in which a relationship between a dynamic load radius and the effective rolling radius is linear,
    the dynamic load radius is a distance between a central axis of the wheel and the road surface, and
    the effective rolling radius is a value obtained by dividing a distance traveled by the tire in one rotation by $2\pi$.

2. The tire slip state determination method according to claim 1, wherein in the region in which the relationship between the dynamic load radius and the effective rolling radius is linear, a correlation coefficient between the dynamic load radius and the effective rolling radius is 0.99 or higher.

3. The tire slip state determination method according to claim 1, wherein the tire driving radius is the effective rolling radius in a 1G state.

4. The tire slip state determination method according to claim 1, wherein the tire driving radius is the effective rolling radius when a vertical load applied to the wheel is in a range from 2000 N to 6500 N.

5. The tire slip state determination method according to claim 1, wherein the effective rolling radius is calculated by dividing a travel distance of a vehicle in a predetermined period detected based on a GNSS signal by a number of rotations of the tire in the predetermined period.

* * * * *